(12) United States Patent
Russakoff

(10) Patent No.: US 8,135,199 B2
(45) Date of Patent: Mar. 13, 2012

(54) METHOD AND APPARATUS OF USING PROBABILISTIC ATLAS FOR FEATURE REMOVAL/POSITIONING

(75) Inventor: Daniel Russakoff, Mountain View, CA (US)

(73) Assignee: Fujifilm Corporation, Tokyo (JP)

( * ) Notice: Subject to any disclaimer, the term of this patent is extended or adjusted under 35 U.S.C. 154(b) by 924 days.

(21) Appl. No.: 11/640,960

(22) Filed: Dec. 19, 2006

(65) Prior Publication Data

US 2008/0144940 A1    Jun. 19, 2008

(51) Int. Cl.
*G06K 9/00* (2006.01)
*G06K 9/62* (2006.01)
*G06K 9/74* (2006.01)
*G06T 11/20* (2006.01)
*A61B 6/04* (2006.01)

(52) U.S. Cl. ........ 382/132; 382/215; 382/228; 345/441; 378/37

(58) Field of Classification Search ................. 382/203, 382/132, 215, 228; 345/441; 378/37
See application file for complete search history.

(56) References Cited

U.S. PATENT DOCUMENTS

| | | | | |
|---|---|---|---|---|
| 5,111,512 | A * | 5/1992 | Fan et al. | 382/122 |
| 6,023,276 | A * | 2/2000 | Kawai et al. | 345/419 |
| 6,118,887 | A * | 9/2000 | Cosatto et al. | 382/103 |
| 7,907,768 | B2 * | 3/2011 | Russakoff | 382/132 |
| 2001/0005204 | A1 * | 6/2001 | Matsumoto et al. | 345/418 |
| 2002/0085219 | A1 * | 7/2002 | Ramamoorthy | 358/1.9 |
| 2004/0062443 | A1 * | 4/2004 | Yen et al. | 382/209 |
| 2005/0031194 | A1 * | 2/2005 | Lee et al. | 382/154 |
| 2005/0058336 | A1 * | 3/2005 | Russell et al. | 382/154 |
| 2007/0081706 | A1 * | 4/2007 | Zhou et al. | 382/128 |
| 2007/0292049 | A1 * | 12/2007 | Liu et al. | 382/299 |
| 2009/0208109 | A1 * | 8/2009 | Kakinami et al. | 382/190 |

OTHER PUBLICATIONS

T.F. Cootes, C.J. Taylor, D.H. Cooper, J. Graham, "Active Shape Models—Their Training and Application" Computer Vision and Image Understanding, vol. 61, issue 1, Jan. 1995, p. 38-59.

"Automated Segmentation of Digitized Mammograms" by U. Bick, M.L. Giger, R. A. Schmidt, R. M. Nishikawa, D. E. Wolverton, K. Doi, Academic Radiol. 2 (1995), p. 1-9.

"Automatic Generation of Shape Models Using Nonrigid Registration with a Single Segmented Template Mesh" by G. Heitz, T. Rohlfing and C. Maurer, Proceedings of Vision, Modeling and Visualization, 2004.

"Automatic Construction of 3-D Statistical Deformation Models of the Brain Using Nonrigid Registration", by D. Rueckert, A. Frangi and J. Schnabel, IEEE Transactions on Medical Imaging, 22(8), p. 1014-1025, Aug. 2003.

* cited by examiner

*Primary Examiner* — Kathleen Y Dulaney
(74) *Attorney, Agent, or Firm* — Birch, Stewart, Kolasch & Birch, LLP

(57) ABSTRACT

Methods and apparatuses process images. The method according to one embodiment accesses digital image data representing an image including an object; accesses reference data including a shape model relating to shape variation of objects from a baseline object, the objects and the baseline object being from a class of the object; and removes from the image an element not related to the object, by representing a shape of the object using the shape model.

11 Claims, 18 Drawing Sheets

Identified nipple position N
on mean breast shape

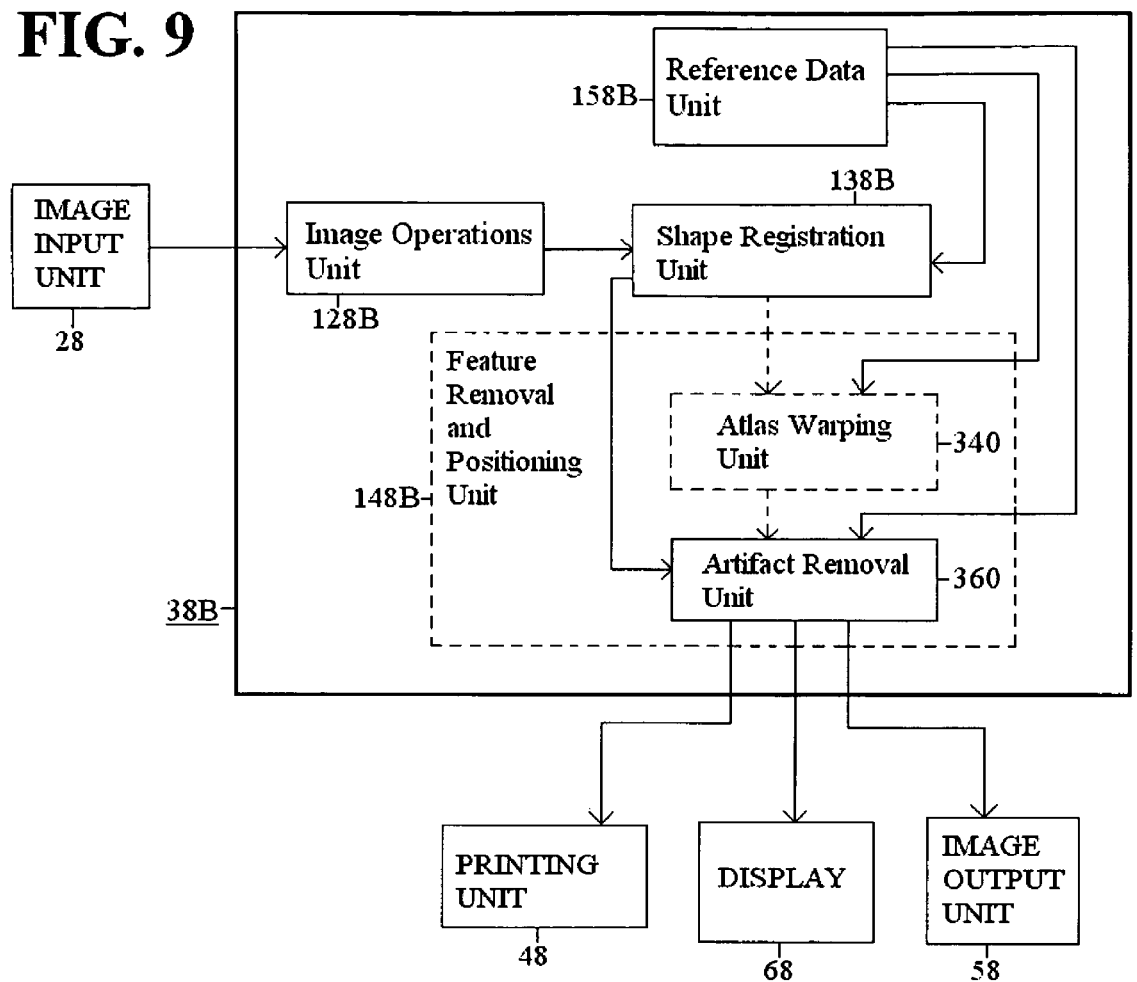

METHOD AND APPARATUS OF USING PROBABILISTIC ATLAS FOR FEATURE REMOVAL/POSITIONING

CROSS REFERENCE TO RELATED APPLICATIONS

This non-provisional application is related to co-pending non-provisional applications titled "Method and Apparatus for Probabilistic Atlas Based on Shape Modeling Technique" and "Method and Apparatus of Using Probabilistic Atlas for Cancer Detection" filed concurrently herewith, the entire contents of which are hereby incorporated by reference.

BACKGROUND OF THE INVENTION

1. Field of the Invention

The present invention relates to a digital image processing technique, and more particularly to a method and apparatus for processing breast images and using a shape model for feature removal/positioning in breast images.

2. Description of the Related Art

Mammography images are powerful tools used in diagnosis of medical problems of breasts. An important feature in mammography images is the breast shape. Clearly detected breast shapes can be used to identify breast abnormalities, such as skin retraction and skin thickening, which are characteristics of malignancy. Clear breast shapes also facilitate automatic or manual comparative analysis between mammography images. Accurate breast shapes may convey significant information relating to breast deformation, size, and shape evolution. The position of the nipple with respect to the breast can be used to detect breast abnormalities. Knowledge of the mammogram view is also important for analysis of breast images, since the mammogram view sets the direction and geometry of a breast in a mammogram image.

Unclear or inaccurate breast shapes may obscure abnormal breast growth and deformation. Mammography images with unclear, unusual, or abnormal breast shapes or breast borders pose challenges when used in software applications that process and compare breast images.

Due to the way the mammogram acquisition process works, the region where the breast tapers off has decreased breast contour contrast, which makes breast borders unclear and poses challenges for breast segmentation. Non-uniform background regions, tags, labels, or scratches present in mammography images may obscure the breast shape and create problems for processing of breast images. Reliable breast shape detection is further complicated by variations in anatomical shapes of breasts and medical imaging conditions. Such variations include: 1) anatomical shape variations between breasts of various people or between breasts of the same person; 2) lighting variations in breast images taken at different times; 3) pose and view changes in mammograms; 4) change in anatomical structure of breasts due to the aging of people; etc. Such breast imaging variations pose challenges for both manual identification and computer-aided analysis of breast shapes.

Disclosed embodiments of this application address these and other issues by using methods and apparatuses for feature removal and positioning in breast images based on a shape modeling technique for breasts. The methods and apparatuses also use an atlas for location of features in breasts. The methods and apparatuses automatically determine views of mammograms using a shape modeling technique for breasts. The methods and apparatuses perform automatic breast segmentation, and automatically determine nipple position in breasts. The methods and apparatuses can be used for automatic detection of other features besides nipples in breasts. The methods and apparatuses can be used for feature removal, feature detection, feature positioning, and segmentation for other anatomical parts besides breasts, by using shape modeling techniques for the anatomical parts and atlases for locations of features in the anatomical parts.

SUMMARY OF THE INVENTION

The present invention is directed to methods and apparatuses for processing images. According to a first aspect of the present invention, an image processing method comprises: accessing digital image data representing an image including an object; accessing reference data including a shape model relating to shape variation of objects from a baseline object, the objects and the baseline object being from a class of the object; and removing from the image an element not related to the object, by representing a shape of the object using the shape model.

According to a second aspect of the present invention, an image processing method comprises: accessing digital image data representing an object; accessing reference data including a shape model relating to shape variation from a baseline object shape; and determining a view of the object, the determining step including performing shape registration for the object and for a mirror object of the object, by representing shapes of the object and of the mirror object using the shape model, to obtain an object registered shape and a mirror object registered shape, and identifying the view by performing a comparative analysis between at least one of the shape of the object, the shape of the mirror object, and the baseline object shape, and at least one of the object registered shape, the mirror object registered shape, and the baseline object shape.

According to a third aspect of the present invention, an image processing method comprises: accessing digital image data representing an object; accessing reference data including a baseline object including an element, and a shape model relating to shape variation from the baseline object; and determining location of the element in the object, the determining step including generating a correspondence between a geometric part associated with the baseline object and a geometric part associated with the object, by representing a shape of the object using the shape model, to obtain a registered shape, and mapping the element from the baseline object onto the registered shape using the correspondence.

According to a fourth aspect of the present invention, an image processing apparatus comprises: an image data input unit for providing digital image data representing an image including an object; a reference data unit for providing reference data including a shape model relating to shape variation of objects from a baseline object, the objects and the baseline object being from a class of the object; and a feature removal unit for removing from the image an element not related to the object, by representing a shape of the object using the shape model.

According to a fifth aspect of the present invention, an image processing apparatus comprises: an image data input unit for providing digital image data representing an object; a reference data unit for providing reference data including a shape model relating to shape variation from a baseline object shape; and a view detection unit for determining a view of the object, the view detection unit determining a view by performing shape registration for the object and for a mirror object of the object, by representing shapes of the object and of the mirror object using the shape model, to obtain an object registered shape and a mirror object registered shape, and identifying the view by performing a comparative analysis between at least one of the shape of the object, the shape of the mirror object, and the baseline object shape, and at least one of the object registered shape, the mirror object registered shape, and the baseline object shape.

According to a sixth aspect of the present invention, an image processing apparatus comprises: an image data input unit for providing digital image data representing an object; a reference data unit for providing reference data including a baseline object including an element, and a shape model relating to shape variation from the baseline object; and an element detection unit for determining location of the element in the object, the element detection unit determining location by generating a correspondence between a geometric part associated with the baseline object and a geometric part associated with the object, by representing a shape of the object using the shape model, to obtain a registered shape, and mapping the element from the baseline object onto the registered shape using the correspondence.

BRIEF DESCRIPTION OF THE DRAWINGS

Further aspects and advantages of the present invention will become apparent upon reading the following detailed description in conjunction with the accompanying drawings, in which:

FIG. 9 is a block diagram of an image processing unit for artifact removal and breast segmentation according to a second embodiment of the present invention illustrated in FIG. 2;

DETAILED DESCRIPTION

Figure 1:
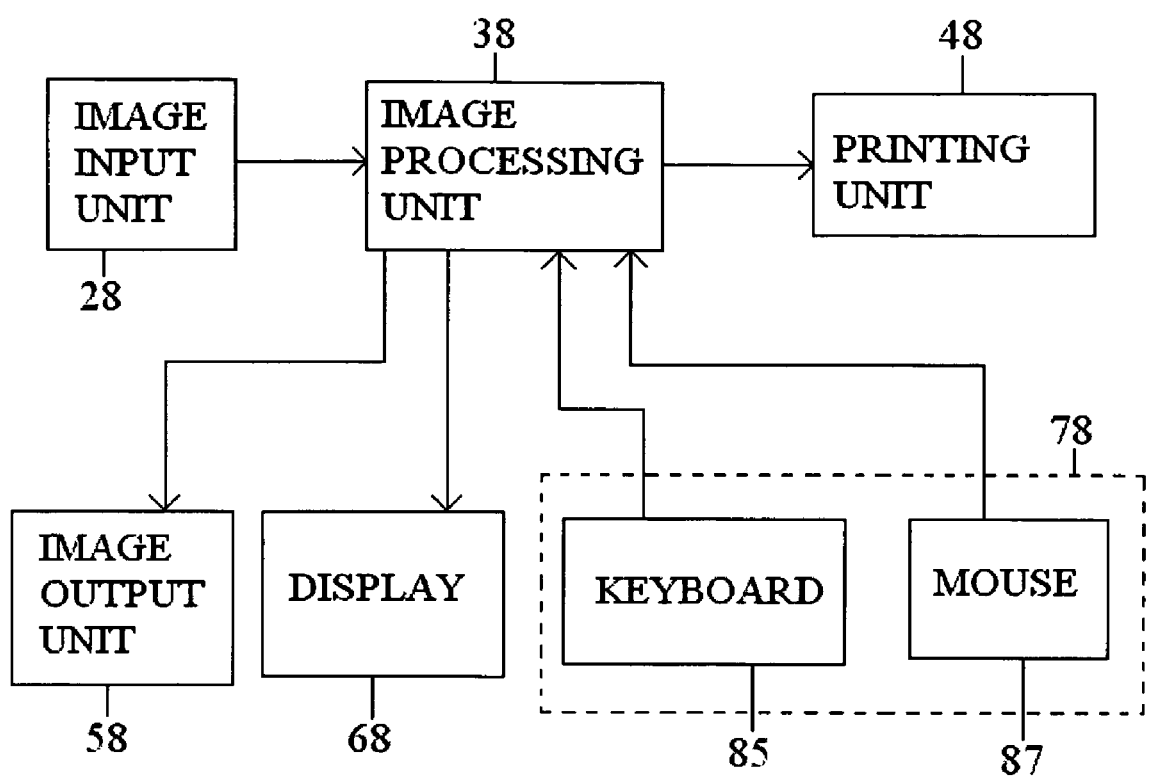
FIG. 1 is a general block diagram of a system including an image processing unit for feature removal/positioning according to an embodiment of the present invention.

Aspects of the invention are more specifically set forth in the accompanying description with reference to the appended figures. FIG. 1 is a general block diagram of a system including an image processing unit for feature removal/positioning according to an embodiment of the present invention. The system 100 illustrated in FIG. 1 includes the following components: an image input unit 28; an image processing unit 38; a display 68; an image output unit 58; a user input unit 78; and a printing unit 48. Operation of the system 100 in FIG. 1 will become apparent from the following discussion.

The image input unit 28 provides digital image data. Digital image data may be medical images such as mammogram images, brain scan images, X-ray images, etc. Digital image data may also be images of non-anatomical objects, images of people, etc. Image input unit 28 may be one or more of any number of devices providing digital image data derived from a radiological film, a diagnostic image, a photographic film, a digital system, etc. Such an input device may be, for example, a scanner for scanning images recorded on a film; a digital camera; a digital mammography machine; a recording medium such as a CD-R, a floppy disk, a USB drive, etc.; a database system which stores images; a network connection; an image processing system that outputs digital data, such as a computer application that processes images; etc.

The image processing unit 38 receives digital image data from the image input unit 28 and performs feature removal/positioning in a manner discussed in detail below. A user, e.g., a radiology specialist at a medical facility, may view the output of image processing unit 38, via display 68 and may input commands to the image processing unit 38 via the user input unit 78. In the embodiment illustrated in FIG. 1, the user input unit 78 includes a keyboard 85 and a mouse 87, but other conventional input devices could also be used.

In addition to performing feature removal/positioning in accordance with embodiments of the present invention, the image processing unit 38 may perform additional image processing functions in accordance with commands received from the user input unit 78. The printing unit 48 receives the output of the image processing unit 38 and generates a hard copy of the processed image data. In addition or as an alternative to generating a hard copy of the output of the image processing unit 38, the processed image data may be returned as an image file, e.g., via a portable recording medium or via a network (not shown). The output of image processing unit 38 may also be sent to image output unit 58 that performs further operations on image data for various purposes. The image output unit 58 may be a module that performs further processing of the image data; a database that collects and compares images; a database that stores and uses feature removal/positioning results received from image processing unit 38; etc.

Figure 2:
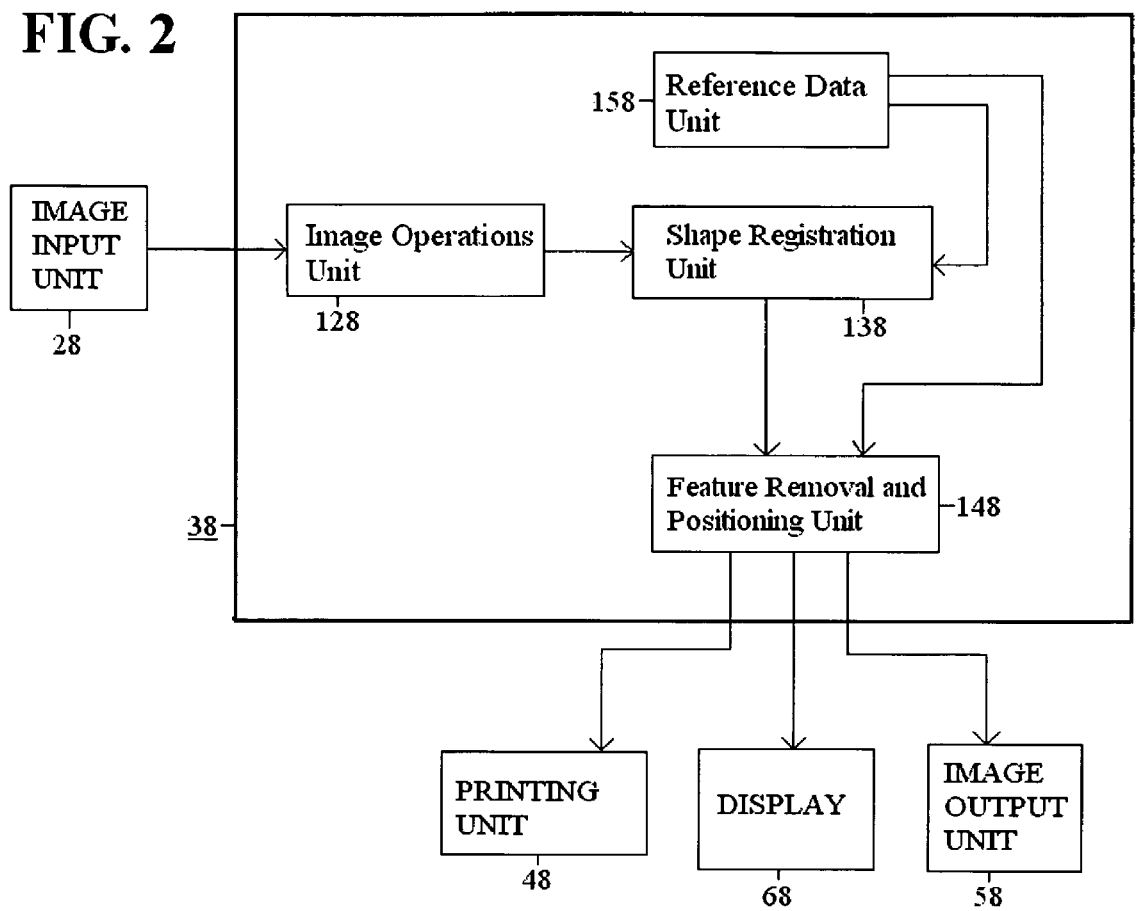
FIG. 2 is a block diagram of an image processing unit for feature removal/positioning according to an embodiment of the present invention.

FIG. 2 is a block diagram of an image processing unit 38 for feature removal/positioning according to an embodiment of the present invention. As shown in FIG. 2, the image processing unit 38 according to this embodiment includes: an image operations unit 128; a shape registration unit 138; a feature removal and positioning unit 148; and a reference data unit 158. Although the various components of FIG. 2 are illustrated as discrete elements, such an illustration is for ease of explanation and it should be recognized that certain operations of the various components may be performed by the same physical device, e.g., by one or more microprocessors.

Generally, the arrangement of elements for the image processing unit 38 illustrated in FIG. 2 performs preprocessing and preparation of digital image data, registration of shapes of objects from digital image data, and feature removal and positioning for objects in digital image data. Image operations unit 128 receives digital image data from image input unit 28. Digital image data can be medical images, which may be obtained through medical imaging. Digital image data may be mammography images, brain scan images, chest X-ray images, etc. Digital image data may also be images of non-anatomical objects, images of people, etc.

Operation of image processing unit 38 will be next described in the context of mammography images, for feature removal/positioning using a probabilistic atlas and/or a shape model for breasts. However, the principles of the current invention apply equally to other areas of image processing, for feature removal/positioning using a probabilistic atlas and/or a shape model for other types of objects besides breasts.

Image operations unit 128 receives a set of breast images from image input unit 28 and may perform preprocessing and preparation operations on the breast images. Preprocessing and preparation operations performed by image operations unit 128 may include resizing, cropping, compression, color correction, etc., that change size and/or appearance of breast images. Image operations unit 128 may also extract breast shape information from breast images, and may store or extract information about breast images, such as views of mammograms.

Image operations unit 128 sends the preprocessed breast images to shape registration unit 138, which performs shape registration for breasts in the breast images. For shape registration, shape registration unit 138 represents breast shapes using a shape model, to obtain registered breast shapes. Shape registration unit 138 retrieves information about the shape model from reference data unit 158, which stores parameters that define the shape model. Reference data unit 158 may also store one or more probabilistic atlases that include information about probability of breast structures at various locations inside breasts, and for various views of breasts recorded in mammograms. Breast structures recorded in probabilistic atlases may be, for example, cancer masses in breasts, benign formations in breasts, breast vessel areas, etc.

Feature removal and positioning unit 148 receives registered breast shapes from shape registration unit 138. Feature removal and positioning unit 148 retrieves data for a baseline breast image and/or data for a probabilistic atlas, from reference data unit 158. Using retrieved data from reference data unit 158, feature removal and positioning unit 148 performs removal of features and/or geometric positioning and processing for registered breast shapes. The output of feature removal and positioning unit 148 are breast images with identified features, and/or breast images from which certain features were removed. The output of feature removal and positioning unit 148 may also include information about locations of removed features or locations of other features of interest in breasts, information about orientation/view of breast images, etc. Feature removal and positioning unit 148 outputs breast images, together with positioning and/or feature removal information. Such output results may be output to image output unit 58, printing unit 48, and/or display 68.

Operation of the components included in image processing unit 38 illustrated in FIG. 2 will be next described with reference to FIG. 3. Image operations unit 128, shape registration unit 138, feature removal and positioning unit 148, and reference data unit 158 are software systems/applications. Image operations unit 128, shape registration unit 138, feature removal and positioning unit 148, and reference data unit 158 may also be purpose built hardware such as FPGA, ASIC, etc.

Figure 3:
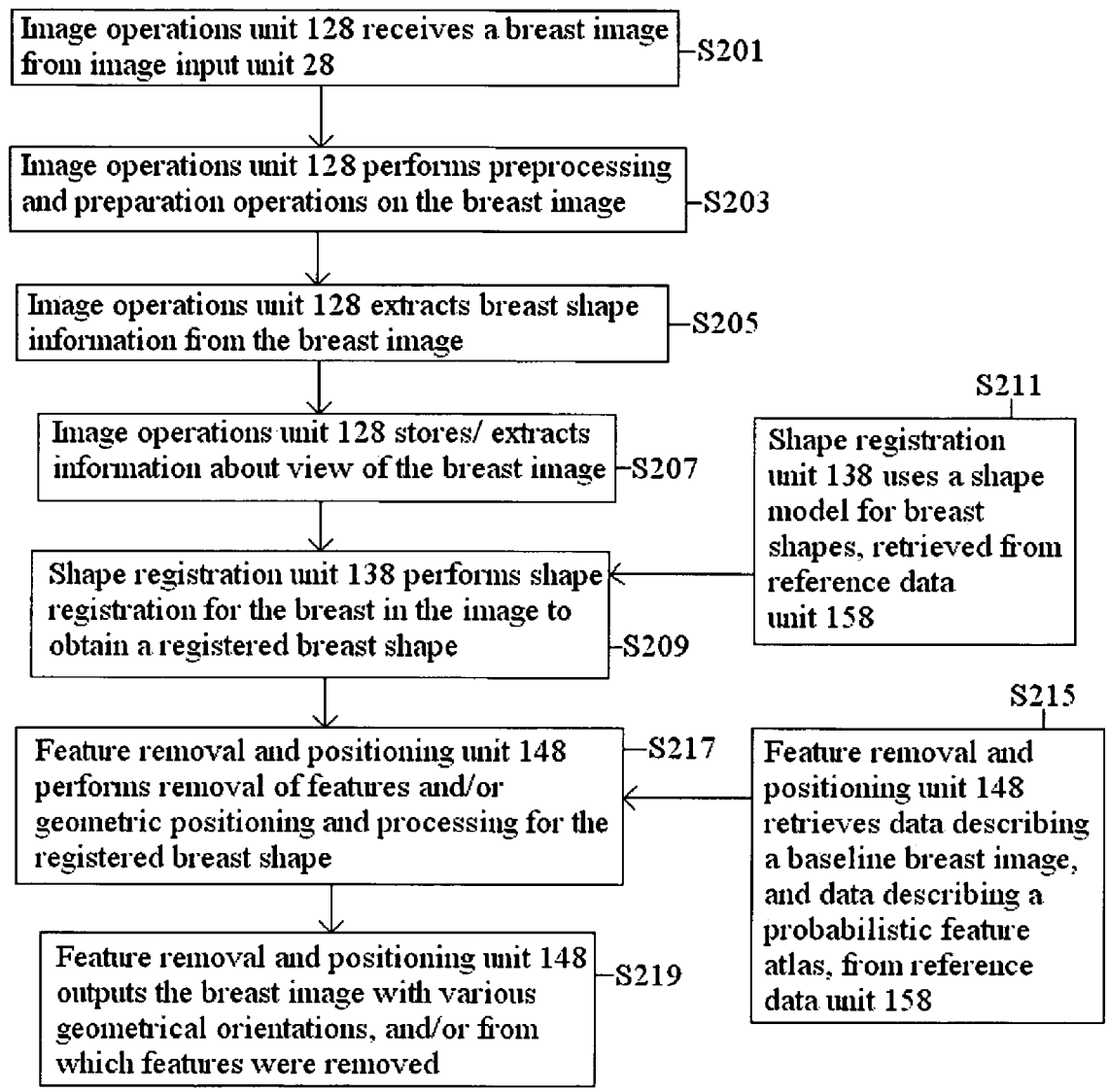
FIG. 3 is a flow diagram illustrating operations performed by an image processing unit for feature removal/positioning according to an embodiment of the present invention illustrated in FIG. 2.

FIG. 3 is a flow diagram illustrating operations performed by an image processing unit 38 for feature removal/positioning according to an embodiment of the present invention illustrated in FIG. 2.

Image operations unit 128 receives a breast image from image input unit 28 (S201). Image operations unit 128 performs preprocessing and preparation operations on the breast image (S203). Preprocessing and preparation operations performed by image operations unit 128 may include resizing, cropping, compression, color correction, etc., that change size and/or appearance of breast images. Image operations unit 128 also extracts breast shape information from the breast image (S205), and stores or extracts information about the view of the breast image (S207).

Image operations unit 128 sends the preprocessed breast image to shape registration unit 138, which performs shape registration for the breast in the image to obtain a registered breast shape (S209). For shape registration, shape registration unit 138 uses a shape model for breast shapes (S211). The shape model describes how shape varies from breast to breast. The shape model is retrieved from reference data unit 158 (S211).

Feature removal and positioning unit 148 receives the registered breast shape from shape registration unit 138. Feature removal and positioning unit 148 retrieves data describing a baseline breast image, which is included in the shape model, from reference data unit 158 (S215). Feature removal and positioning unit 148 may also retrieve from reference data unit 158 data describing a probabilistic feature atlas (S215). The probabilistic atlas includes information about probability of features at various locations inside breasts. Using the retrieved data from reference data unit 158, feature removal and positioning unit 148 performs removal of features from the breast image and/or geometric positioning and processing for the registered breast shape (S217). Feature removal and positioning unit 148 outputs the breast image with identified geometrical orientations, and/or from which certain features were removed (S219). Such output results may be output to image output unit 58, printing unit 48, and/or display 68.

Figure 4:
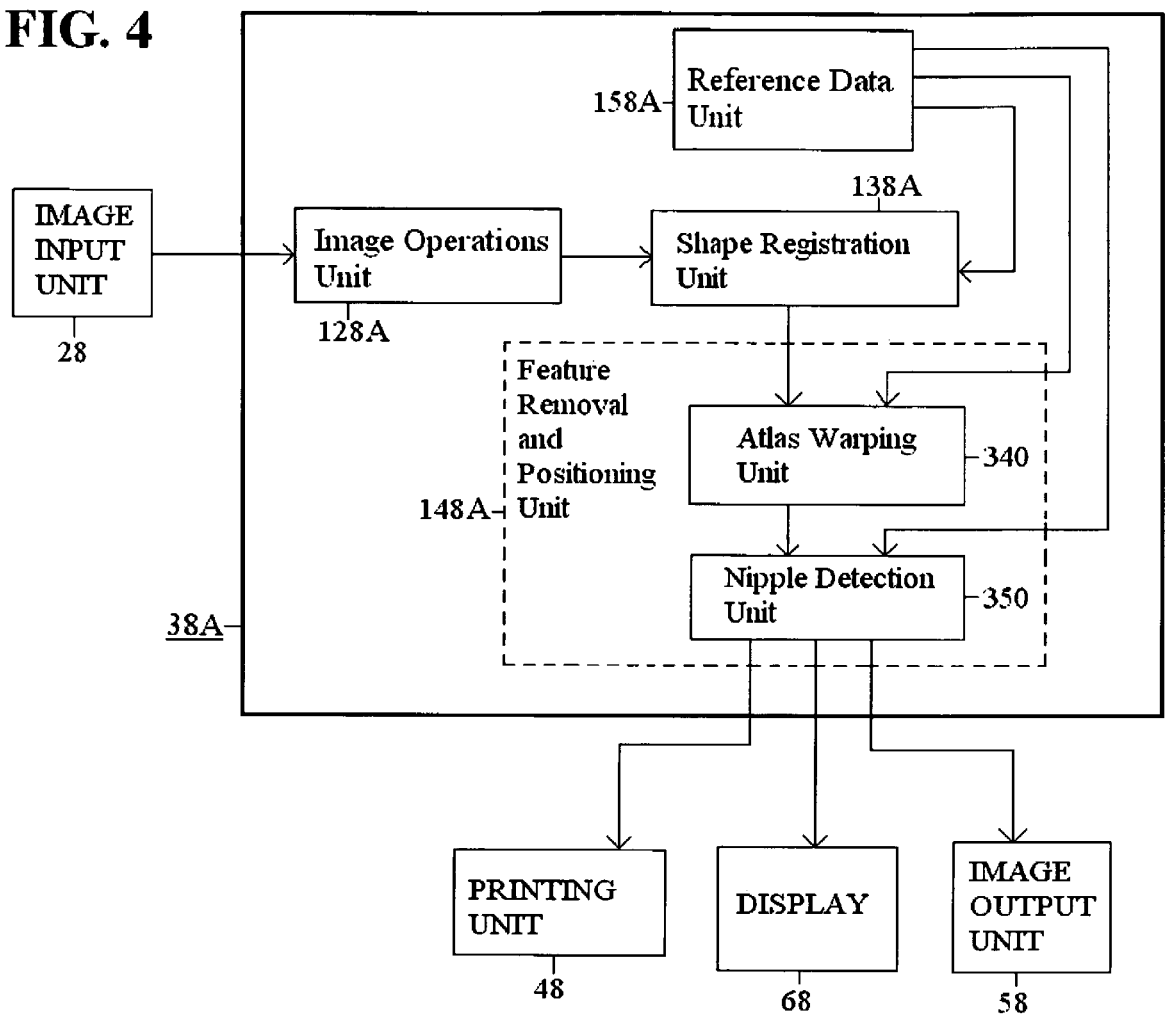
FIG. 4 is a block diagram of an image processing unit for nipple detection according to an embodiment of the present invention illustrated in FIG. 2.

FIG. 4 is a block diagram of an image processing unit 38A for nipple detection according to an embodiment of the present invention illustrated in FIG. 2. As shown in FIG. 4, the image processing unit 38A according to this embodiment includes: an image operations unit 128A; a shape registration unit 138A; an atlas warping unit 340; a nipple detection unit 350; and a reference data unit 158A. The atlas warping unit 340 and the nipple detection unit 350 are included in a feature removal and positioning unit 148A.

Image operations unit 128A receives a set of breast images from image input unit 28, and may perform preprocessing and preparation operations on the breast images. Preprocessing and preparation operations performed by image operations unit 128A may include resizing, cropping, compression, color correction, etc., that change size and/or appearance of breast images. Image operations unit 128A creates breast mask images including pixels that belong to the breasts in the breast images. Breast mask images are also called breast shape silhouettes in the current application. Breast mask images may be created, for example, by detecting breast borders or breast clusters, for the breasts shown in the breast images. Image operations unit 128A may also store/extract information about breast images, such as views of the mammograms.

Image operations unit 128A sends the breast mask images to shape registration unit 138A, which performs shape registration for breast mask images. For shape registration, shape registration unit 138A describes breast mask images using a shape model, to obtain registered breast shapes. Shape registration unit 138A retrieves information about the shape model from reference data unit 158A, which stores parameters that define the shape model.

Each mammogram view is associated with a shape model. A shape model may consist of a baseline breast atlas shape and a set of deformation modes. In one embodiment, the baseline breast atlas shape is a mean breast shape representing the average shape of a breast for a given mammogram view. Other baseline breast atlas shapes may also be used. The deformation modes define directions for deformation from contour points of breasts in the breast images, onto corresponding contour points of the breast in the baseline breast atlas shape. The shape model is obtained by training off-line, using large sets of training breast images. A baseline breast atlas shape can be obtained from the sets of training breast images. Deformation modes, describing variation of shapes of training breast images from the baseline breast atlas shape, are also obtained during training. Details on generation of a breast shape model using sets of training breast images can be found in the co-pending non-provisional application titled "Method and Apparatus for Probabilistic Atlas Based on Shape Modeling Technique", the entire contents of which are hereby incorporated by reference.

A baseline breast atlas shape is generated during off-line training from a large number of training breast mask images. The baseline breast atlas shape may be, for example, a mean breast shape obtained by aligning centers of mass of training breast mask images. The alignment of centers of mass of training breast mask images results in a probabilistic map in which the brighter a pixel is, the more likely it is for the pixel to appear in a training breast mask image. A probability threshold may be applied to the probabilistic map, to obtain a mean breast shape in which every pixel has a high probability of appearing in a training breast mask image. Hence, the baseline breast atlas shape illustrates a baseline breast. Additional details regarding generation of a baseline breast atlas shape/mean breast shape can be found in the co-pending non-provisional application titled "Method and Apparatus for Probabilistic Atlas Based on Shape Modeling Technique", the entire contents of which are hereby incorporated by reference. The baseline breast atlas shape also includes a baseline nipple for the baseline breast. The baseline nipple position is identified in the baseline breast atlas shape during off-line training.

To extract deformation modes for a shape model, training breast mask images are warped onto the baseline breast atlas shape during off-line training, to define parameterization of breast shape. Control points may be placed along the edges of the baseline breast atlas shape. A deformation grid is generated using the control points. Using the deformation grid, the control points are warped onto training breast mask images. Shape representations for the training breast mask images are generated by the corresponding warped control points, together with centers of mass of the shapes defined by the warped control points. Additional details about generating shape representations for training breast images can be found in the co-pending non-provisional application titled "Method and Apparatus for Probabilistic Atlas Based on Shape Modeling Technique", the entire contents of which are hereby incorporated by reference.

Principal modes of deformation between training breast mask images and the baseline breast atlas shape may be determined using the shape representations for the training breast mask images. Principal modes of deformation can be found using Principal Components Analysis (PCA) techniques. The principal components obtained from PCA represent modes of deformation between training breast mask images and the baseline breast atlas shape. Additional details regarding extraction of deformation modes are found in the co-pending non-provisional application titled "Method and Apparatus for Probabilistic Atlas Based on Shape Modeling Technique", the entire contents of which are hereby incorporated by reference.

The baseline breast atlas shape, and the modes of deformation between training breast mask images and the baseline breast atlas shape define a shape model. Shape models can be obtained during off-line training, for each mammogram view. Shape models are stored in reference data unit 158A.

A new breast mask shape received from image operations unit 128A may then be represented using a shape model from reference data unit 158A. A breast mask shape may be expressed as a function of the baseline breast atlas shape, which may be a mean breast shape ($B_a$) in an exemplary embodiment, and of the shape model deformation modes, as:

$$\text{Breast Shape} = p + B_a + \sum_{i=1}^{k} \alpha_i L_i \qquad (1)$$

where p is an offset (such as a 2D offset) to the mean breast shape $B_a$ to account for a rigid translation of the entire shape, $L_i$, i=1 . . . k is the set of deformation modes of the shape model, and $\alpha_i$, i=1 . . . k are a set of parameters that define the deviations of Breast Shape from the mean breast shape along the axes associated with the principal deformation modes. The parameters $\alpha_i$, i=1 . . . k are specific to each breast mask. Hence, an arbitrary breast mask may be expressed as a sum of the fixed mean breast shape ($B_a$), a linear combination of fixed deformation modes $L_i$ multiplied by coefficients $\alpha_i$, and a 2D offset p. Details on how a mean breast shape/baseline breast atlas shape $B_a$ and deformation modes $L_i$, i=1 . . . k are obtained during training, using training breast images can be found in the co-pending non-provisional application titled "Method and Apparatus for Probabilistic Atlas Based on Shape Modeling Technique", the entire contents of which are hereby incorporated by reference.

Each mammogram view $v_i$ is associated with a mean breast shape ($B_{a\_vi}$) specific to that view, and with a set of deformation modes $L_{i\_vi}$, i=1 . . . $k_{vi}$ specific to that view.

For each breast mask image $B_{mask\_new}$ received from image operations unit 128A, shape registration unit 138A retrieves the mean breast shape ($B_{a\_vi}$) and the set of deformation modes $L_{i\_vi}$, i=1 . . . $k_{vi}$ associated with the view $v_i$ of the breast mask image $B_{mask\_new}$. Shape registration unit 138A next identifies the parameters $\alpha_i$, i=1 . . . $k_{vi}$ and the 2D offset p for the breast mask image $B_{mask\_new}$, to fit the breast mask image $B_{mask\_new}$ with its correct shape representation of the form:

$$\text{Breast Shape} = B_{a\_vi} + p + \sum_{i=1}^{k_{vi}} \alpha_i L_{i\_vi}.$$

Atlas warping unit 340 receives the registration results for the breast mask image $B_{mask\_new}$ from shape registration unit 138A. Registration results for the breast mask image $B_{mask\_new}$ include the parameters $\alpha_i$, i=1 . . . $k_{vi}$ for the breast mask image $B_{mask\_new}$ and the functional representation $$\text{Breast Shape} = B_{a\_vi} + p + \sum_{i=1}^{k_{vi}} \alpha_i L_{i\_vi}$$

for the breast mask image $B_{mask\_new}$. Atlas warping unit 340 then warps the breast mask image $B_{mask\_new}$ to the mean breast shape $B_{a\_vi}$. Atlas warping unit 340 may, alternatively, warp the breast mask image $B_{mask\_new}$ to a probabilistic feature atlas $A_{vi}$ specific to the view $v_i$ of the breast mask image $B_{mask\_new}$. The probabilistic feature atlas data is stored in reference data unit 158A.

The probabilistic feature atlas $A_{vi}$ includes an image of the mean breast shape $B_{a\_vi}$ for view $v_i$, together with probabilities for presence of a feature at each pixel in the mean breast shape $B_{a\_vi}$. Hence, the probabilistic atlas $A_{vi}$ is a weighted pixel image, in which each pixel of the mean breast shape $B_{a\_vi}$ is weighted by the feature probability for that pixel.

The probabilistic feature atlas is obtained by training off-line, using large sets of training breast images with previously identified feature structures. Features recorded in probabilistic atlases may be cancer masses in breasts, benign formations in breasts, breast vessel areas, etc. The shapes of training breast images are represented as linear combinations of deformation modes obtained in training. Using the shape representations for the training breast images, previously identified features in the training breast images are mapped to the baseline breast atlas shape obtained in training. By overlapping feature positions from the training images onto the baseline breast atlas shape, a probabilistic atlas containing probabilities for presence of a feature in the baseline breast atlas shape is obtained. Additional details on generation of a probabilistic atlas using sets of training breast images with previously identified features can be found in the co-pending non-provisional application titled "Method and Apparatus for Probabilistic Atlas Based on Shape Modeling Technique", the entire contents of which are hereby incorporated by reference.

After atlas warping unit 340 warps the breast mask image $B_{mask\_new}$ to the probabilistic atlas $A_{vi}$ or to the mean breast shape $B_{a\_vi}$, a warped breast mask image $B_{mask\_new\_warped}$ is obtained. Feature probability weights from the probabilistic atlas $A_{vi}$ are associated with pixels in the warped image $B_{mask\_new\_warped}$. The baseline nipple position from the mean breast shape $B_{a\_vi}$ is also associated with pixels in the warped image $B_{mask\_new\_warped}$.

Nipple detection unit 350 receives the warped breast mask image $B_{mask\_new}$ warped, together with shape registration information of the form Breast Shape=

$$B_{a\_vi} + p + \sum_{i=1}^{k_{vi}} \alpha_i L_{i\_vi},$$

that establishes a correspondence between pixels of $B_{mask\_new\_warped}$ and pixels of $B_{mask\_new}$.

Nipple detection unit 350 warps the $B_{mask\_new\_warped}$ image back to the original $B_{mask\_new}$, and an image $P_{mask\_new}$, is obtained. Since the baseline nipple position has been identified in the baseline breast atlas shape during off-line training, and since $B_{mask\_new\_warped}$ has the shape of the baseline breast atlas shape, the image $P_{mask\_new}$ includes a warped nipple position from $B_{mask\_new\_warped}$ to $B_{mask\_new}$. Hence, the image $P_{mask\_new}$ is an image of the breast mask image $B_{mask\_new}$, in which the position of the nipple has been identified. Therefore, the image $P_{mask\_new}$ includes nipple detection results for the original breast mask $B_{mask\_new}$.

If atlas warping unit 340 warped the breast mask image $B_{mask\_new}$ to probabilistic atlas $A_{vi}$, the image $P_{mask\_new}$ includes feature probabilities for various breast features, at various pixel locations inside the breast mask image $B_{mask\_new}$. Hence, in this case, the image $P_{mask\_new}$ is a weighted pixel image, in which each pixel of the breast mask image $B_{mask\_new}$ is weighted by the feature probability for that pixel. If the feature is a cancer structure for example, the image $P_{mask\_new}$ is a weighted pixel image, in which each pixel of the breast mask image $B_{mask\_new}$ is weighted by the probability for cancer at that pixel. Additional details on mapping feature probabilities from a probabilistic atlas $A_{vi}$ to a breast mask image $B_{mask\_new}$ to obtain a probability map for a feature in a breast mask image $B_{mask\_new}$ can be found in the co-pending non-provisional application titled "Method and Apparatus of Using Probabilistic Atlas for Cancer Detection", the entire contents of which are hereby incorporated by reference.

The identified nipple position in image $P_{mask\_new}$ provides very useful information for detection of the nipple and for the position of the nipple with respect to the breast. If the image $P_{mask\_new}$ includes cancer probabilities associated with pixels of the $B_{mask\_new}$ breast mask from a probabilistic cancer atlas, image $P_{mask\_new}$ provides information about the nipple position with respect to probable locations of cancer masses in the $B_{mask\_new}$ breast mask. The position of the nipple with respect to the breast can be used to detect breast abnormalities. Since the position of the nipple with respect to the breast is influenced by breast abnormalities, information about nipple position and nipple proximity to high probability cancer regions in breast help in identification of cancer masses, structural changes, breast abnormalities, etc.

The initially identified nipple position in image $P_{mask\_new}$ (and hence in breast mask image $B_{mask\_new}$) can also be a starting point for performing a refinement of the nipple position. Refinement of the nipple position can be performed, for example, in regions adjacent to or including the initially identified nipple position in image $P_{mask\_new}$.

Nipple detection unit 350 outputs the image $P_{mask\_new}$. The image $P_{mask\_new}$ may be output to image output unit 58, printing unit 48, and/or display 68.

Image operations unit 128A, shape registration unit 138A, atlas warping unit 340, nipple detection unit 350, and reference data unit 158A are software systems/applications. Image operations unit 128A, shape registration unit 138A, atlas warping unit 340, nipple detection unit 350, and reference data unit 158A may also be purpose built hardware such as FPGA, ASIC, etc.

Figure 5:
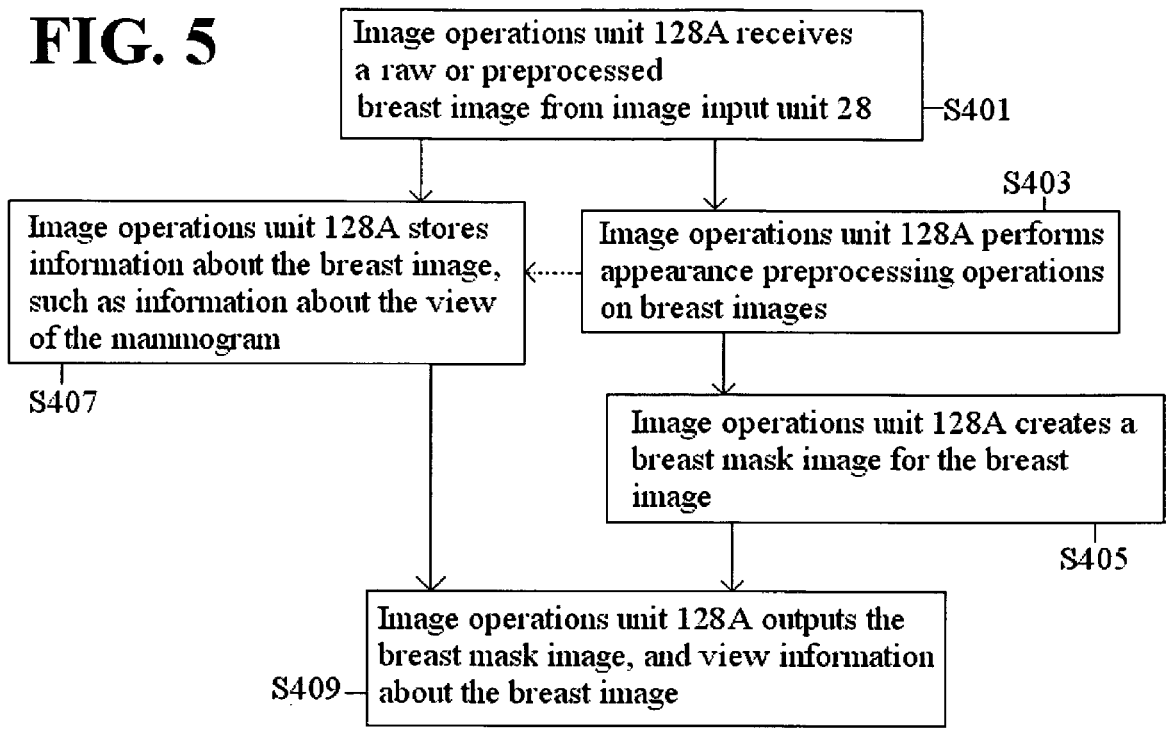
FIG. 5 is a flow diagram illustrating operations performed by an image operations unit included in an image processing unit for feature removal/positioning according to an embodiment of the present invention illustrated in FIG. 4.

FIG. 5 is a flow diagram illustrating operations performed by an image operations unit 128A included in an image processing unit 38A for feature removal/positioning according to an embodiment of the present invention illustrated in FIG. 4.

Image operations unit 128A receives a raw or preprocessed breast image from image input unit 28 (S401). The breast image may be retrieved by image operations unit 128A from, for example, a breast imaging apparatus, a database of breast images, etc. Image operations unit 128A may perform preprocessing operations on the breast image (S403). Preprocessing operations may include resizing, cropping, compression, color correction, etc.

Image operations unit 128A creates a breast mask image for the breast image (S405). The breast mask image includes pixels that belong to the breast. The breast mask image may be created by detecting breast borders for the breast shown in the breast image. Image operations unit 128A may create a breast mask image by detecting breast borders using methods described in the U.S. patent application titled "Method and Apparatus for Breast Border Detection", application Ser. No. 11/366,495, by Daniel Russakoff and Akira Hasegawa, filed on Mar. 3, 2006, the entire contents of which are hereby incorporated by reference. With the techniques described in the "Method and Apparatus for Breast Border Detection" application, pixels in the breast image are represented in a multi-dimensional space, such as a 4-dimensional space with x-locations of pixels, y-locations of pixels, intensity value of pixels, and distance of pixels to a reference point. K-means clustering of pixels is run in the multi-dimensional space, to obtain clusters for the breast image. Cluster merging and connected components analysis are then run using relative intensity measures, brightness pixel values, and cluster size, to identify a cluster corresponding to the breast in the breast image. A set of pixels, or a mask, containing breast pixels is obtained. The set of pixels for a breast forms a breast mask $B_{mask}$.

Other breast border detection techniques may also be used by image operations unit 128A to obtain a breast mask image.

Image operations unit 128A also stores information about the breast image, such as information about the view of the mammogram (S407). Examples of mammogram views are MLL (medio-lateral left), MLR (medio-lateral right), CCL (cranio-caudal left), CCR (cranio-caudal right), RCC, LRR, LMLO (left medio-lateral oblique), and RMLO (right medio-lateral oblique). Image operations unit 128A outputs the breast mask image, and information about the view of the breast image (S409), to shape registration unit 138A.

Figure 6:
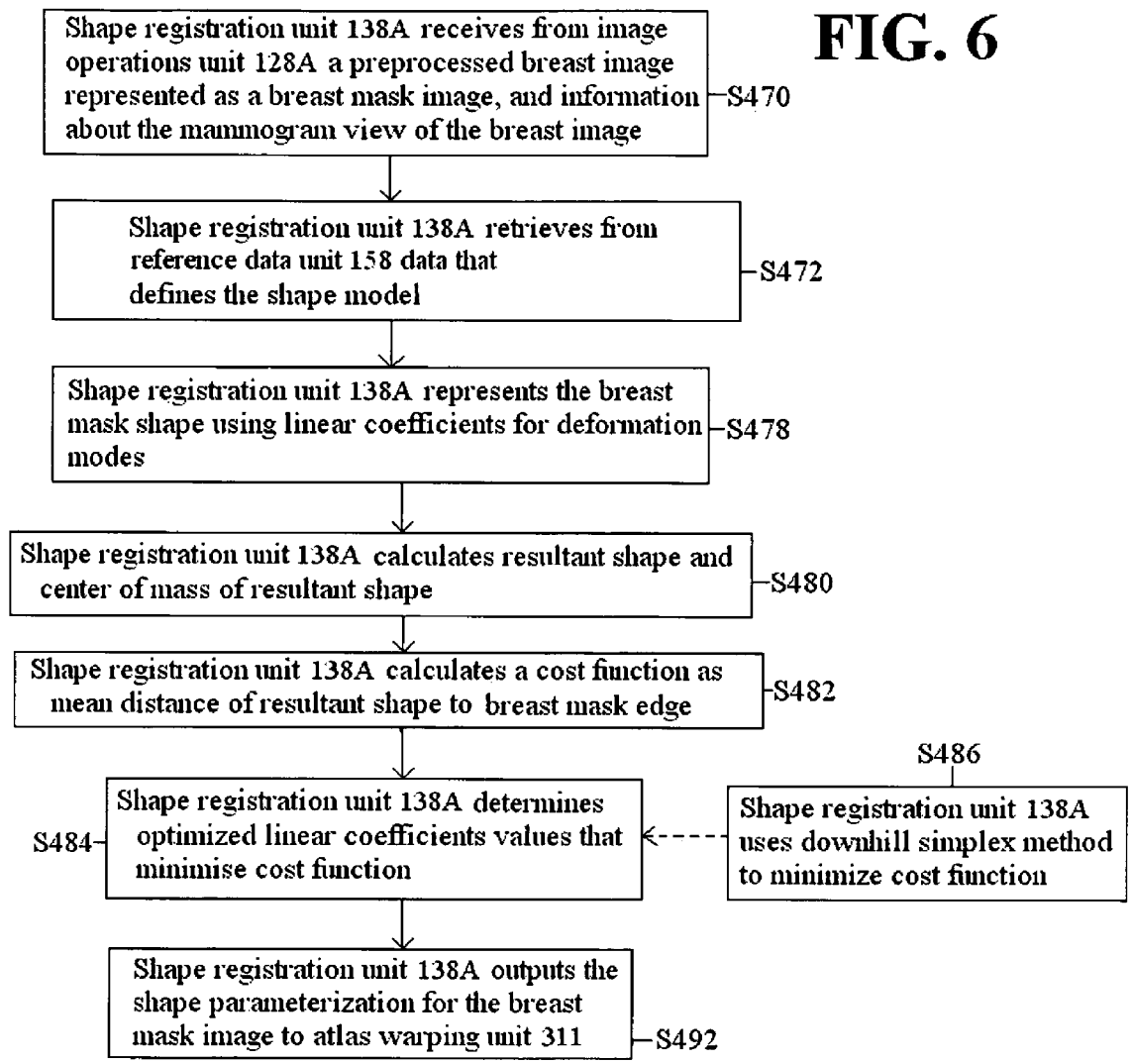
FIG. 6 is a flow diagram illustrating operations performed by a shape registration unit included in an image processing unit for feature removal/positioning according to an embodiment of the present invention illustrated in FIG. 4.

FIG. 6 is a flow diagram illustrating operations performed by a shape registration unit 138A included in an image processing unit 38A for feature removal/positioning according to an embodiment of the present invention illustrated in FIG. 4.

Shape registration unit 138A receives from image operations unit 128A a preprocessed breast image, represented as a breast mask image $B_{mask\_new}$ (S470). Information about the mammogram view $v_i$ of the breast image is also received (S470). Shape registration unit 138A retrieves from reference data unit 158A data that defines the shape model for that view, including a mean breast shape ($B_{a\_vi}$) and shape model deformation modes $L_{i\_vi}$, i=1 ... $k_{vi}$ for the view $v_i$ of the breast mask image $B_{mask\_new}$ (S472).

Shape registration unit 138A fits the breast mask image $B_{mask\_new}$ with its correct shape representation as a linear combination of the deformation modes, $$\text{Shape} = B_{a\_vi} + p + \sum_{i=1}^{k_{vi}} \alpha_i L_{i\_vi},$$

by determining parameters $\alpha_i$, i=1 ... $k_{vi}$ and the 2D offset p.

To fit the breast mask image $B_{mask\_new}$ with its correct shape representation, shape registration unit 138A optimizes the $\alpha_i$ values, together with an x offset $p_x$ and a y offset $p_y$, for a total of k+2 parameters: ($p_x$, $p_y$, $\alpha$), where $\alpha=(\alpha_1, \alpha_2, ..., \alpha_k)$ and p=($p_x$, $p_y$) (S478). For optimization, shape registration unit 138A uses a cost function defined as the mean distance to edge. For a ($p_x$, $p_y$, $\alpha$) parameter set, shape registration unit 138A calculates the new shape resulting from this parameter set by formula $$\text{Shape} = B_{a\_vi} + p + \sum_{i=1}^{k_{vi}} \alpha_i L_{i\_vi}(S480).$$

The center of mass (Shape.COM) of Shape is then calculated (S480). For each shape point on the exterior (border) of Shape, shape registration unit 138A generates a ray containing the Shape.COM and the shape point, finds the intersection point of the ray with the edge of $B_{mask\_new}$, and calculates how far the shape point is from the intersection point obtained in this manner. This technique is further illustrated in FIG. 8D. In an alternative embodiment, the minimum distance from the shape point to the edge of $B_{mask\_new}$ is calculated. The mean distance for the Shape points to the edges of the breast mask image $B_{mask\_new}$ is then calculated (S482). Optimized $\alpha_i$ values and 2D offset p are selected for which the mean distance of shape points of Shape to the breast mask image $B_{mask\_new}$ edges attains a minimum (S484).

Shape registration unit 138A may use the downhill simplex method, also known as the Nelder-Mead or the amoeba algorithm (S486), to fit the breast mask image $B_{mask\_new}$ with its correct shape representation, by minimizing distances of the edge shape points of Shape to the edges of the breast mask image $B_{mask\_new}$. The downhill simplex method is a single-valued minimization algorithm that does not require derivatives. The downhill simplex algorithm is typically very robust.

With the Nelder-Mead method, the k+2 parameters ($p_x$, $p_y$, $\alpha$) form a simplex in a multi-dimensional space. The Nelder-Mead method minimizes the selected cost function, by moving points of the simplex to decrease the cost function. A point of the simplex may be moved by reflections against a plane generated by other simplex points, by reflection and expansion of the simplex obtained from a previous reflection, by contraction of the simplex, etc.

Once parameters of the shape model are optimized for the breast mask image $B_{mask\_new}$, shape registration unit 138A outputs the shape registration results for the breast mask image $B_{mask\_new}$ to atlas warping unit 301 (S492).

Figure 7:
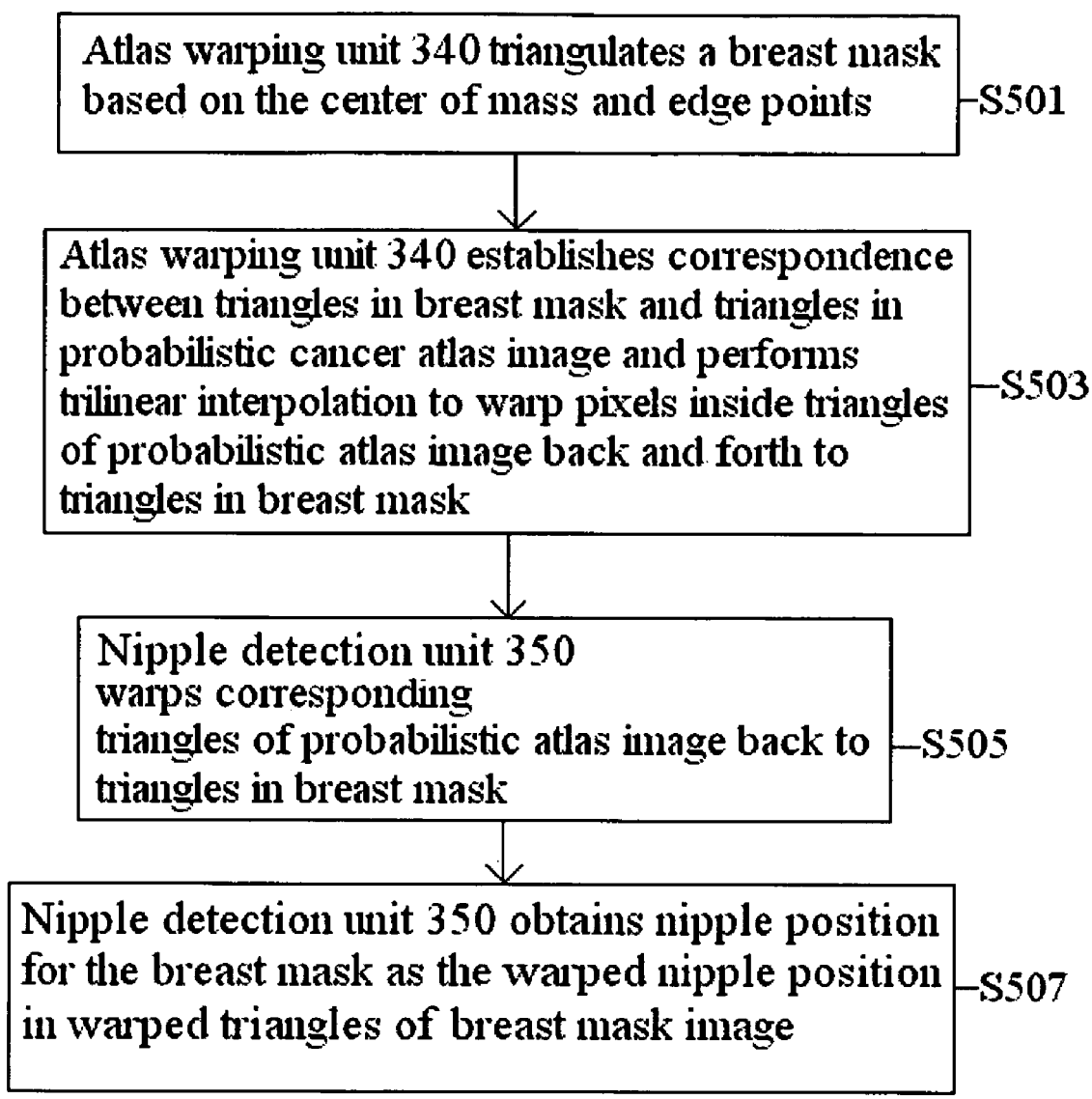
FIG. 7 is a flow diagram illustrating exemplary operations performed by a feature removal and positioning unit included in an image processing unit for feature removal/positioning according to an embodiment of the present invention illustrated in FIG. 4.

FIG. 7 is a flow diagram illustrating exemplary operations performed by a feature removal and positioning unit 148A included in an image processing unit 38A for feature removal/positioning according to an embodiment of the present invention illustrated in FIG. 4. FIG. 7 illustrates exemplary operations that may be performed by an atlas warping unit 340 and a nipple detection unit 350 included in a feature removal and positioning unit 148A.

Atlas warping unit 340 warps the registered shape for breast mask image $B_{mask\_new}$ to a probabilistic atlas $A_{vi}$, or to a baseline breast atlas shape $B_{a\_vi}$, associated with the view $v_i$ of the breast mask image $B_{mask\_new}$. Warping to probabilistic atlas $A_{vi}$ or to the baseline breast atlas shape $B_{a\_vi}$ may be performed by triangulating the breast mask $B_{mask\_new}$ based on its center of mass and edge points (S501). After shape registration has been performed by shape registration unit 138A, each triangle in the breast mask $B_{mask\_new}$ corresponds to a triangle in the probabilistic atlas $A_{vi}$ and to a triangle in the baseline breast atlas shape $B_{a\_vi}$ (S503), as the probabilistic atlas $A_{vi}$ has the shape of the baseline breast atlas shape $B_{a\_vi}$. Pixels inside corresponding triangles of the atlas $A_{vi}$ (or $B_{a\_vi}$) can be warped back and forth into triangles of breast mask $B_{mask\_new}$, using a bilinear interpolation in 2D (S503). In an exemplary implementation, the bilinear interpolation in 2D may be performed by multiplying each of the triangle vertices by appropriate relative weights, as further described at FIG. 8J.

Nipple detection unit 350 warps back corresponding triangles of the atlas $A_{vi}$ (or $B_{a\_vi}$), to triangles in breast mask $B_{mask\_new}$ (S505). The nipple position for the breast mask image $B_{mask\_new}$ is the warped nipple position from triangles of the baseline breast atlas shape $B_{a\_vi}$ (or probabilistic atlas $A_{vi}$) to triangles of the breast mask image $B_{mask\_new}$ (S507). Hence, an image with a location for the nipple is obtained for the breast mask $B_{mask\_new}$ (S507).

Feature probabilities associated with pixels in triangles of the atlas image $A_{vi}$ may become associated with pixels in triangles of breast mask $B_{mask\_new}$, as further described in the co-pending non-provisional application titled "Method and Apparatus of Using Probabilistic Atlas for Cancer Detection", the entire contents of which are hereby incorporated by reference. Hence, the image with an identified nipple location may also contain feature probability values associated with image pixels, for features such as cancer structures, benign structures, etc.

Figure 8A:
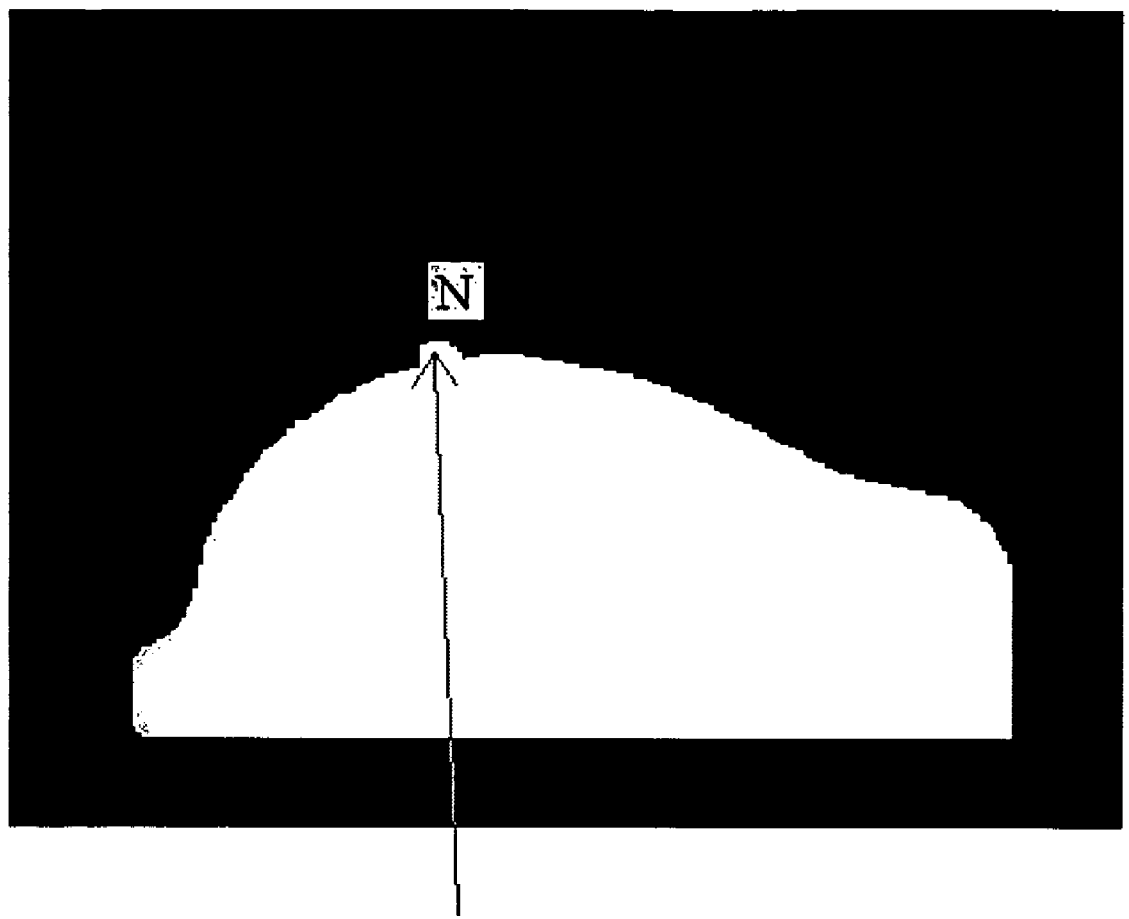
FIG. 8A illustrates an exemplary baseline breast atlas shape with identified baseline nipple position for the ML view for a shape model stored in a reference data unit.

FIG. 8A illustrates an exemplary baseline breast atlas shape for the ML view, with identified nipple position. The exemplary baseline breast atlas shape for the ML view is included in a shape model stored in a reference data unit 158. The baseline breast atlas shape in FIG. 8A is a mean breast shape representing the set of pixels that have 95% or more chance of appearing in a breast mask image in the ML view. The nipple N has been identified on the mean breast shape.

Figure 8B:
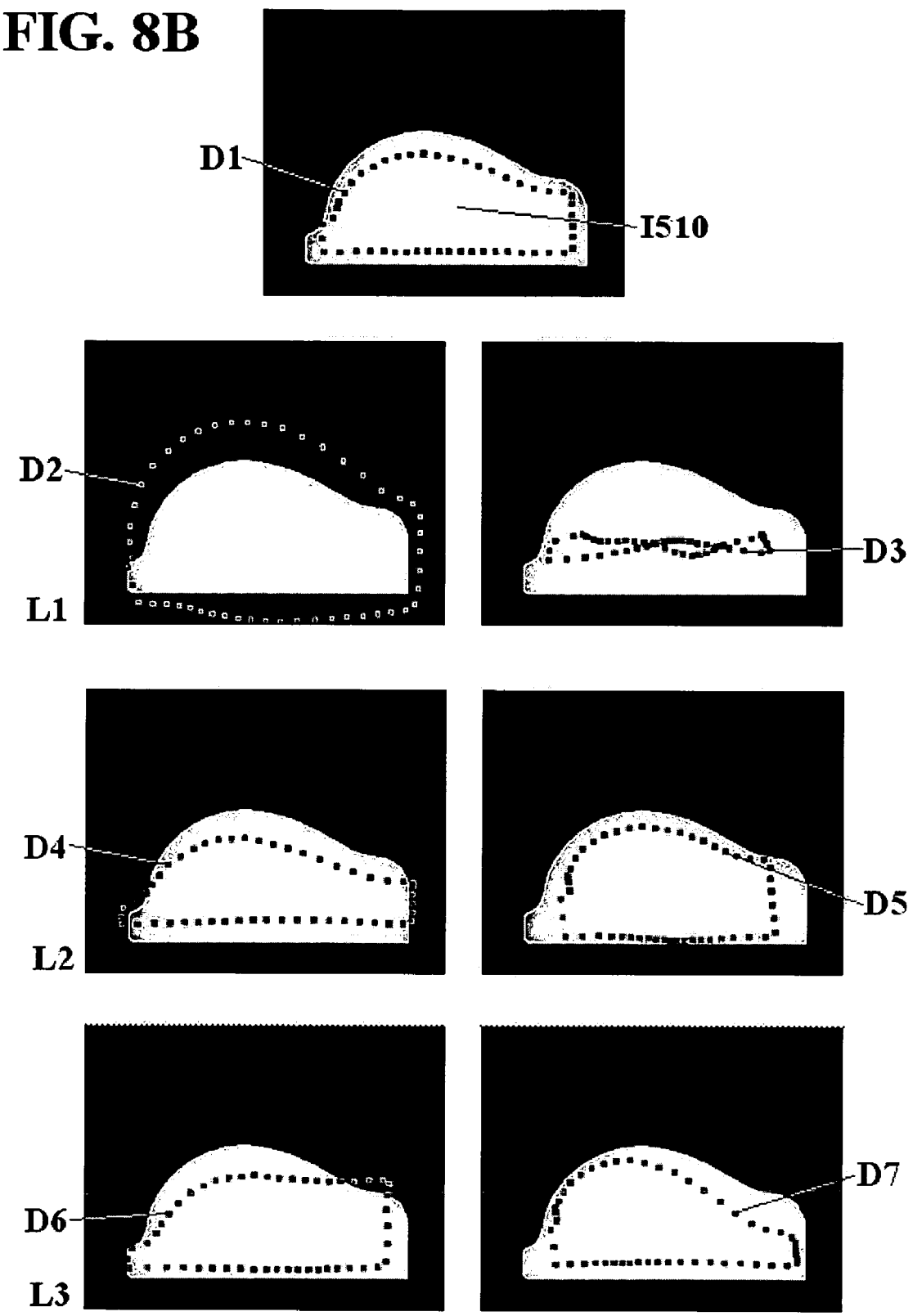
FIG. 8B illustrates exemplary deformation modes for a shape model stored in a reference data unit.

FIG. 8B illustrates exemplary deformation modes for a shape model stored in the reference data unit 158. The breast shape in figure I510 is an exemplary baseline breast atlas shape (mean shape, in this case) for the ML view.

The first 3 modes (L1, L2, L3) of deformation are shown. The first mode of deformation is L1. Contours D2 and D3 define the deformation mode L1. The deformation mode L1 consists of directions and proportional length of movement for each contour point from the D2 contour to a corresponding contour point from the D3 contour. Contours D4 and D5 define the second deformation mode L2, and contours D6 and D7 define the third deformation mode L3.

The deformation modes shown in FIG. 8B may be obtained by training, using techniques described in the co-pending non-provisional application titled "Method and Apparatus for Probabilistic Atlas Based on Shape Modeling Technique", the entire contents of which are hereby incorporated by reference.

Figure 8C:
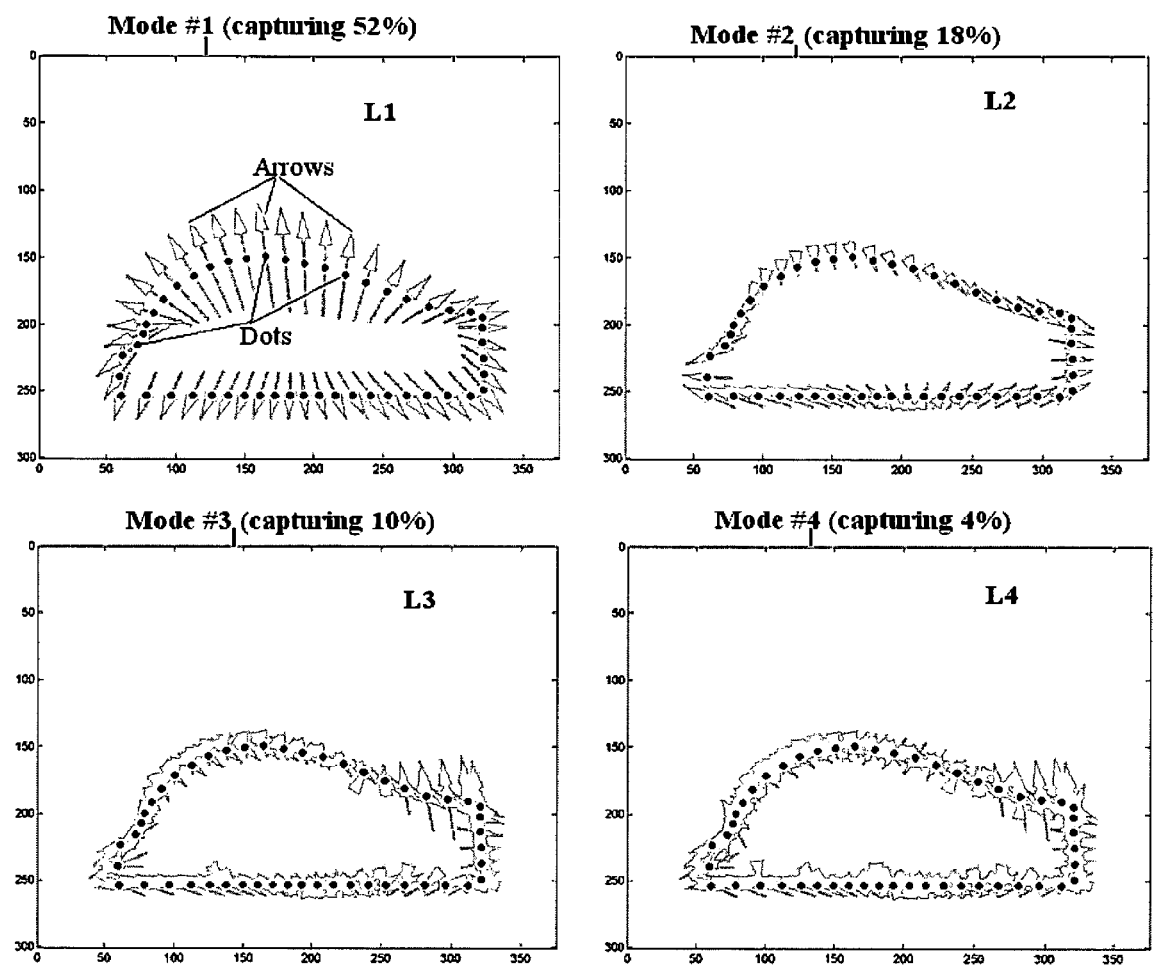
FIG. 8C illustrates another set of exemplary deformation modes for a shape model stored in a reference data unit.

FIG. 8C illustrates another set of exemplary deformation modes for a shape model stored in the reference data unit 158. The deformation modes shown in FIG. 8C were obtained by training a shape model using 4900 training breast images of ML view, using techniques described in the co-pending non-provisional application titled "Method and Apparatus for Probabilistic Atlas Based on Shape Modeling Technique", the entire contents of which are hereby incorporated by reference. 17 deformation modes, capturing 99% of the variance in the breast images data set, were obtained. The representations of the first 4 modes L1, L2, L3 and L4 are shown in FIG. 8C. The representations of the first 4 modes L1, L2, L3 and L4 together capture 85% of the data's variance. For each mode shown in FIG. 8C, the mean breast shape (baseline breast atlas shape) for the ML view is plotted with dots (points), while the arrows represent the distance traveled by one point for that mode from −2 standard deviations to +2 standard deviations of the mean breast shape. Mode L1 captures 52% of the variance in the breast images data set, mode L2 captures 18% of the variance in the breast images data set, mode L3 captures 10% of the variance in the breast images data set, and mode L4 captures 4% of the variance in the breast images data set. The rest of the deformation modes (L5 to L17) are not shown.

Figure 8D:
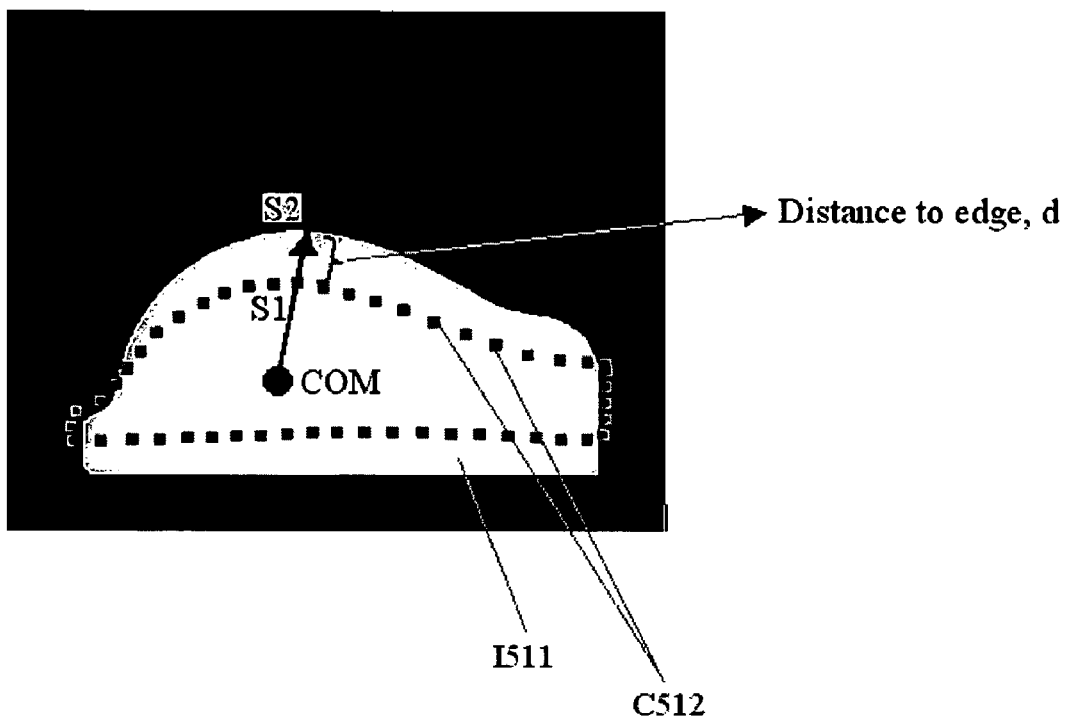
FIG. 8D illustrates exemplary aspects of the operation of calculating a cost function by a shape registration unit for a registered shape according to an embodiment of the present invention illustrated in FIG. 6.

FIG. 8D illustrates exemplary aspects of the operation of calculating a cost function by a shape registration unit 138A for a registered shape according to an embodiment of the present invention illustrated in FIG. 6. Shape registration is performed for the breast mask $B_{mask\_new}$ I511 using an $\alpha_i$, i=1 . . . k parameter set and a 2D offset p. A shape bounded by contour C512 is obtained from formula $$\text{Shape} = B_{a\_vi} + p + \sum_{i=1}^{k} \alpha_i L_{i\_vi},$$

where $B_{a\_vi}$ is a mean breast shape for view $v_i$ of the breast mask $B_{mask\_new}$, and $L_{i\_vi}$, i=1 . . . $k_{vi}$ are shape model deformation modes. The center of mass COM for the Shape bounded by contour C512 is found. For a point S1 on the contour (perimeter) of Shape, a line is drawn through the COM point. The line intersects the contour of breast mask $B_{mask\_new}$ I511 at point S2. The distance to edge is the distance d between points S1 and S2. Distances d are obtained for all points on the contour (perimeter) C512 of Shape, and a cost function is obtained as the mean of all distances d.

Figure 8E:
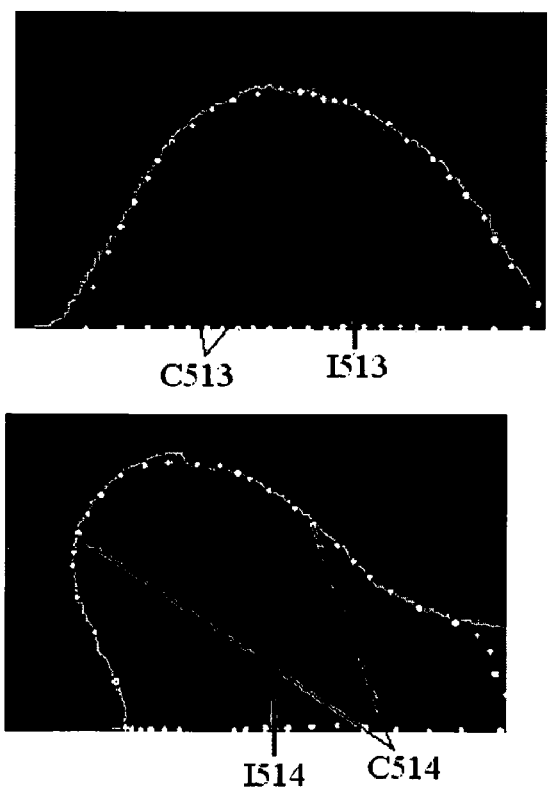
FIG. 8E illustrates exemplary results of the operation of performing shape registration for breast masks by a shape registration unit according to an embodiment of the present invention illustrated in FIG. 6.

FIG. 8E illustrates exemplary results of the operation of performing shape registration for breast masks by a shape registration unit 138A according to an embodiment of the present invention illustrated in FIG. 6. As shown in FIG. 8E, breast masks I513 and I514 are fit with shape representations. The shape registration results bounded by contours C513 and C514 are effectively describing the shapes of breast masks I513 and I514. The downhill simplex algorithm was used by shape registration unit 138A to obtain the shape registration results shown in FIG. 8E.

Figure 8F:
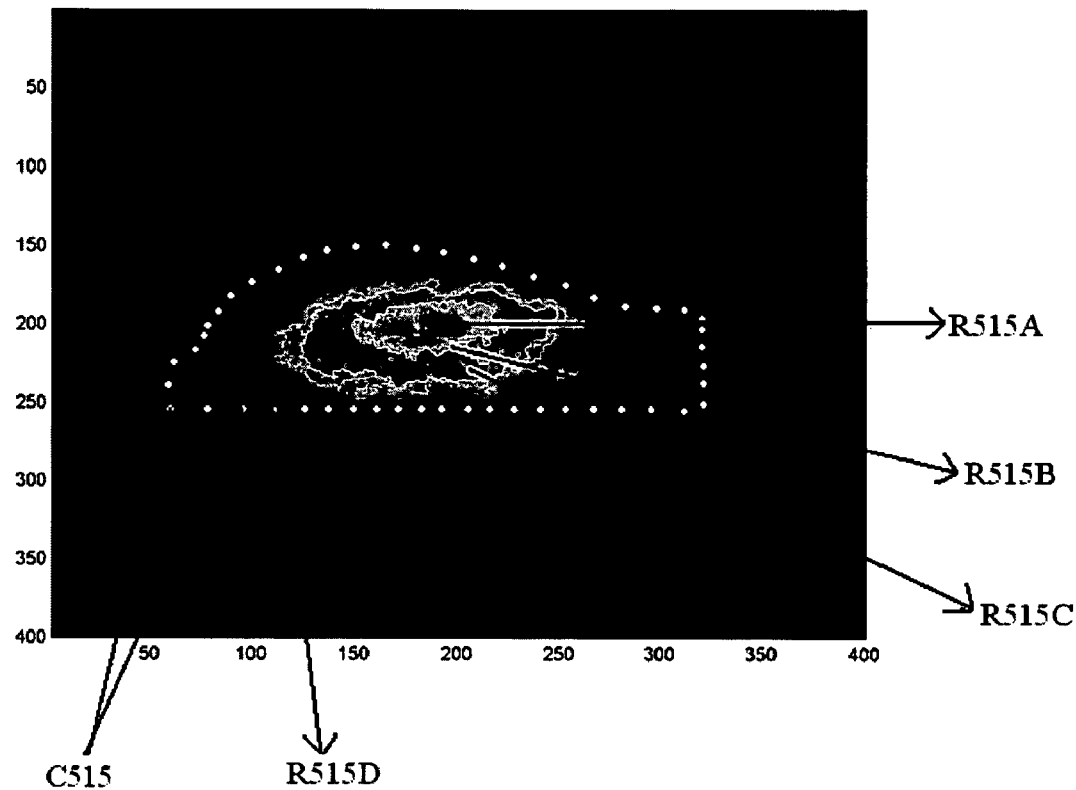
FIG. 8F illustrates an exemplary ML view probabilistic atlas for probability of cancer in breasts stored in a reference data unit.

FIG. 8F illustrates an exemplary ML view probabilistic atlas for probability of cancer in breasts stored in the reference data unit 158. For the ML view probabilistic atlas in FIG. 8F, the contour C515 is the contour of the mean breast shape (baseline breast atlas shape) $B_{a\_ML}$ for the ML view. The region R515A indicates the highest probability of cancer, followed by regions R515B, then R515C, and R515D. As shown in the probabilistic atlas, the probability for cancer is largest in the center of a breast, and decreases towards edges of the mean breast shape.

Figure 8G:
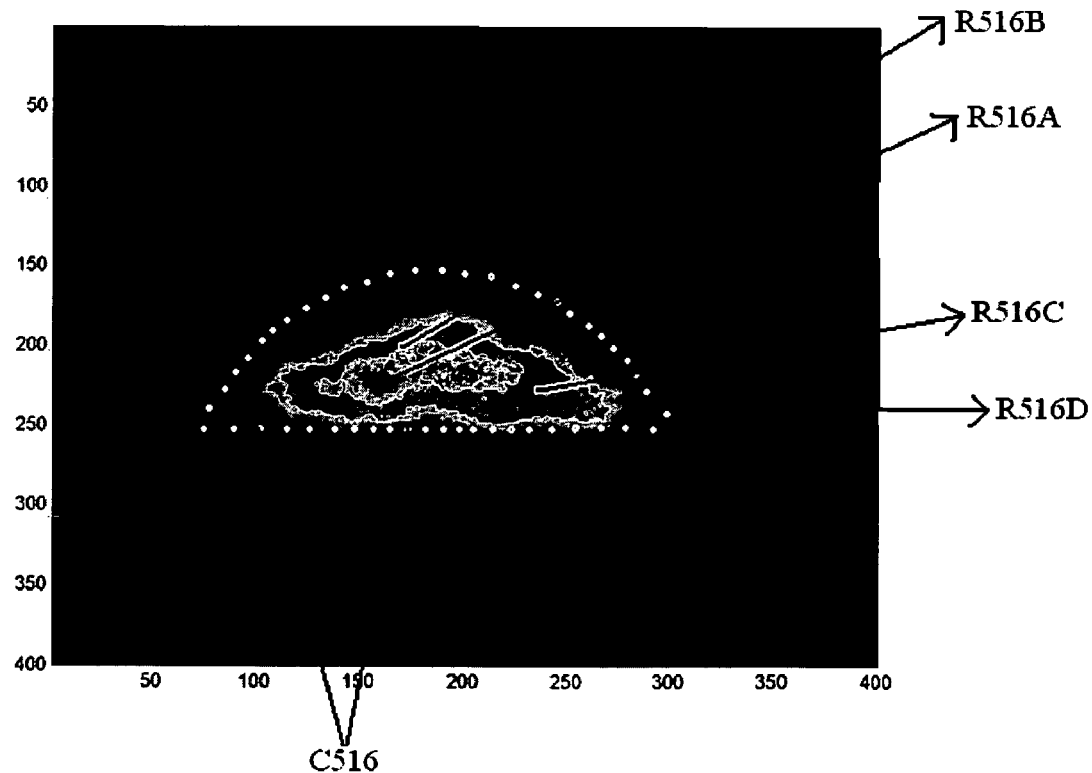
FIG. 8G illustrates an exemplary CC view probabilistic atlas for probability of cancer in breasts stored in a reference data unit.

FIG. 8G illustrates an exemplary CC view probabilistic atlas for probability of cancer in breasts stored in the probabilistic atlas reference data unit 158. For the CC view probabilistic atlas in FIG. 8G, the contour C516 is the contour of the mean breast shape for the CC view. The region R516A indicates the highest probability of cancer, followed by regions R516B, then R516C, and R516D. As shown in the probabilistic atlas, the probability for cancer is largest in the center left region of a breast, and decreases towards edges of the mean breast shape.

Figure 8H:
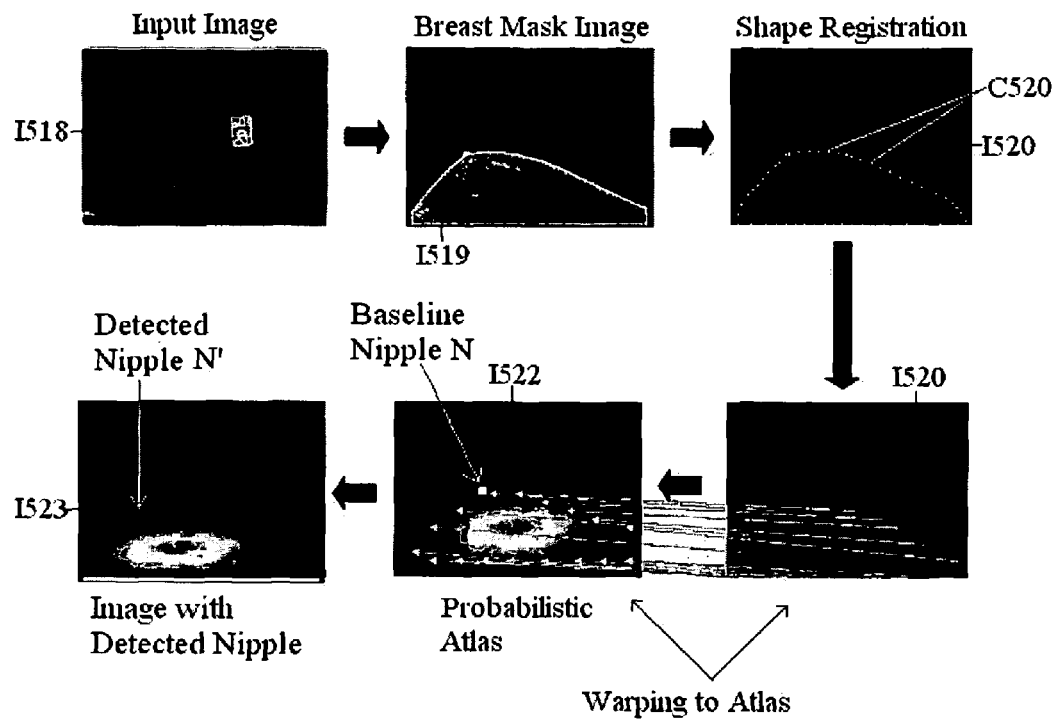
FIG. 8H illustrates exemplary aspects of the operation of detecting nipple position for a breast image by an image processing unit for feature removal/positioning according to an embodiment of the present invention illustrated in FIG. 4.

FIG. 8H illustrates exemplary aspects of the operation of detecting nipple position for a breast image by an image processing unit 38A for feature removal/positioning according to an embodiment of the present invention illustrated in FIG. 4. As illustrated in FIG. 8H, a breast image I518 is input by image operations unit 128A. Image operations unit 128A extracts a breast mask image I519 for the breast image I518. Shape registration unit 138A performs shape registration for the breast mask image, by representing the shape of the breast mask using a shape model. The shape registration contour C520 fits the shape of the breast mask from image I519. Atlas warping unit 340 warps the breast mask registered shape I520 to a probabilistic atlas (or alternatively to a baseline breast atlas shape) I522 that includes a detected baseline nipple N. Atlas warping unit 340 performs warping by generating a correspondence between pixels of the breast mask registered shape I520 and pixels of the probabilistic atlas (or of the baseline breast atlas shape) I522. Using the correspondence, nipple detection unit 350 warps the probabilistic atlas (or baseline breast atlas shape) I522 onto the breast mask registered shape I520, hence obtaining an image I523 with detected nipple position N' corresponding to the baseline nipple position N, for the breast image I518.

Figure 8I:
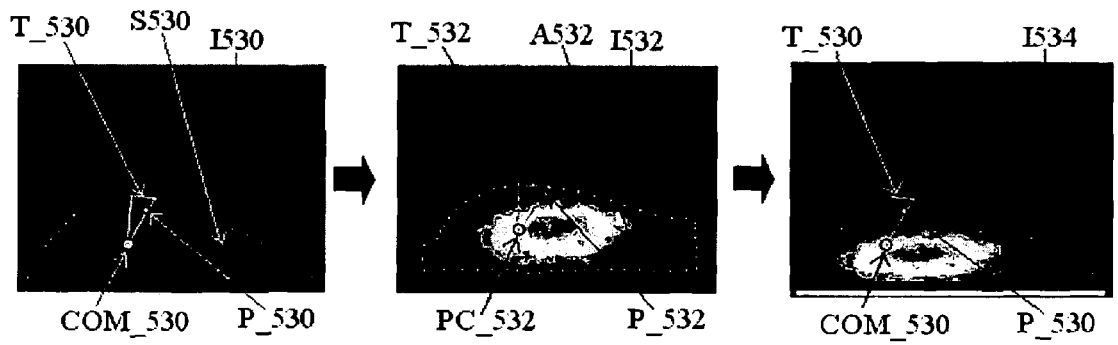
FIG. 8I illustrates exemplary aspects of the operation of warping a breast mask to an atlas using triangulation by a feature removal and positioning unit according to an embodiment of the present invention illustrated in FIG. 7.

FIG. 8I illustrates exemplary aspects of the operation of warping a breast mask to an atlas using triangulation by a feature removal and positioning unit 148A according to an embodiment of the present invention illustrated in FIG. 7.

Atlas warping unit 340 warps a registered shape S530 for a breast mask image $B_{mask\_new}$ I530 to a probabilistic atlas $A_{vi}$ (or to a baseline breast atlas shape) A532 shown in image I532. Warping to probabilistic atlas $A_{vi}$ (or to baseline breast atlas shape) A532 is performed by triangulating the breast mask shape S530 based on its center of mass COM_530 and edge points. A test point P_530 is used to generate a triangle in the breast mask shape S530. For example, a triangle T_530 is generated using the center of mass COM_530 and the test point P_530 and touching the edges of mask shape S530. The triangle is warped to probabilistic atlas $A_{vi}$ (or to baseline breast atlas shape) A532 onto a corresponding triangle T_532, with the COM_530 and the test point P_530 mapped to corresponding points PC_532 and P_532. The probabilistic atlas $A_{vi}$ (or baseline breast atlas shape) A532 is then warped onto registered shape S530 by warping each triangle T_532 back onto the corresponding triangle T_530 of the breast mask $B_{mask\_new}$ I530. The nipple position the probabilistic atlas $A_{vi}$ (or baseline breast atlas shape) A532 is hence warped onto registered shape S530 associated with the breast mask image $B_{mask\_new}$ I530.

Figure 8J:
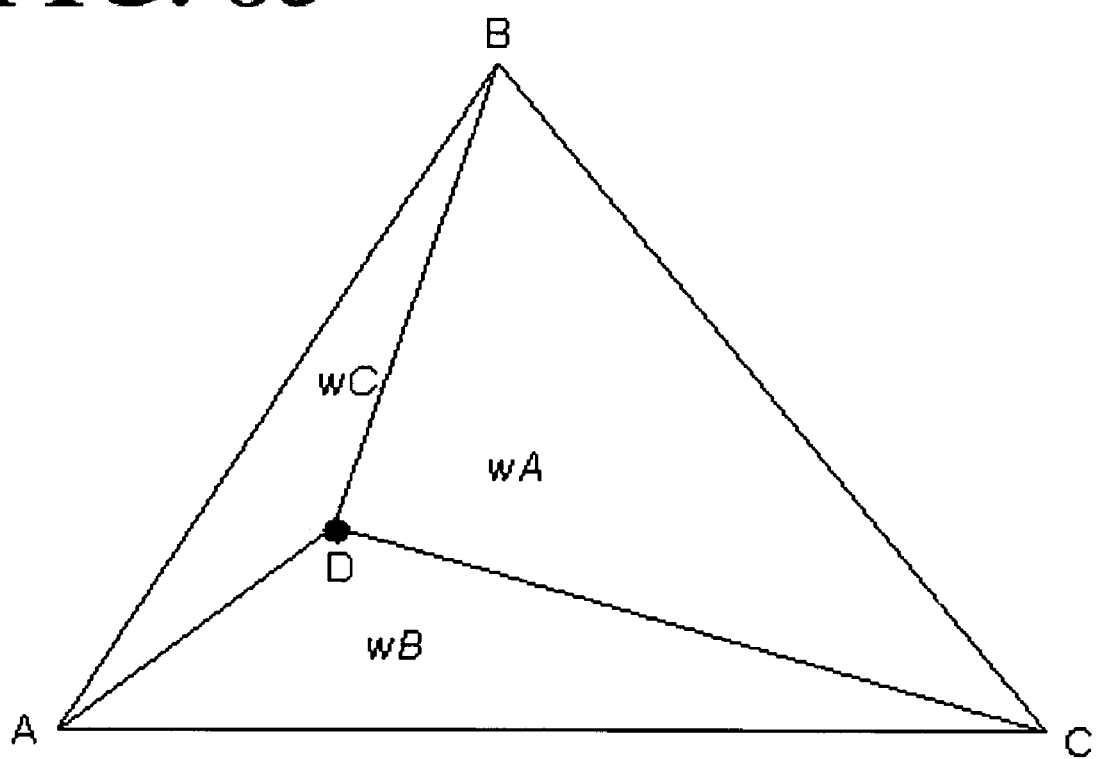
FIG. 8J illustrates exemplary aspects of the operation of bilinear interpolation according to an embodiment of the present invention illustrated in FIG. 7.

FIG. 8J illustrates exemplary aspects of the operation of bilinear interpolation according to an embodiment of the present invention illustrated in FIG. 7. The pixels inside corresponding triangles of the atlas $A_{vi}$ (or baseline breast atlas shape $B_{a\_vi}$) can be warped back and forth to triangles in breast mask $B_{mask\_new}$, using a bilinear interpolation. For a correspondence between two triangles, bilinear interpolation in 2D is performed by multiplying each of the vertices by appropriate relative weights as described in FIG. 8J. Given a triangle with vertices A, B, and C, the pixel intensity at point D can be obtained as:

$$D = A*wA/T_{abc} + B*wB/T_{abc} + C*wC/T_{abc} \quad (2)$$

where A, B, and C are pixel intensities at triangle vertices, $T_{abc}$ is the area of triangle ABC, wA is the area of triangle BCD, wB is the area of triangle ACD, and wC is the area of triangle ABD, so that $T_{abc} = wA + wB + wC$. Hence, given pixels A, B, and C of a triangle inside atlas $A_{vi}$ (or inside $B_{a\_vi}$), and corresponding pixels A', B', and C' of a corresponding triangle in breast mask $B_{mask\_new}$, a pixel D inside triangle ABC can be warped to a pixel D' inside triangle A'B'C', using equation (2) in triangle A'B'C'.

FIG. 9 is a block diagram of an image processing unit 38B for artifact removal and breast segmentation according to a second embodiment of the present invention illustrated in FIG. 2. As shown in FIG. 9, the image processing unit 38B according to this embodiment includes: an image operations unit 128B; a shape registration unit 138B; an optional atlas warping unit 340; an artifact removal unit 360; and a reference data unit 158B. The atlas warping unit 340 and the artifact removal unit 360 are included in a feature removal and positioning unit 148B.

Image operations unit 128B receives a breast image from image input unit 28, and may perform preprocessing and preparation operations on the breast image. Preprocessing and preparation operations performed by image operations unit 128B may include resizing, cropping, compression, color correction, etc., that change size and/or appearance of the breast image. Image operations unit 128B creates a breast mask image. Breast mask images may be created, for example, by detecting breast borders or breast clusters for the breasts shown in the breast image. Image operations unit 128B may also store/extract information about the breast image, such as view of mammogram.

Image operations unit 128B may perform preprocessing and breast mask extraction operations in a similar manner to image operations unit 128A described in FIG. 5. Image operations unit 128B may create a breast mask image by detecting breast borders using methods described in the U.S. patent application titled "Method and Apparatus for Breast Border Detection", application Ser. No. 11/366,495, by Daniel Russakoff and Akira Hasegawa, filed on Mar. 3, 2006, the entire contents of which are hereby incorporated by reference. Other methods may also be used to create a breast mask image.

Image operations unit 128B sends the breast mask images to shape registration unit 138B, which performs shape registration for the breast mask image. For shape registration, shape registration unit 138B describes the breast mask image using a shape model, to obtain a registered breast shape. Shape registration unit 138B retrieves information about the shape model from reference data unit 158B, which stores parameters that define the shape model.

The reference data unit 158B is similar to reference data unit 158A from FIG. 4. Reference data unit 158B stores shape models, and may also store probabilistic atlases for breast features. A shape model and an optional probabilistic atlas stored by reference data unit 158B can be generated off-line, using training breast images. Details on generation of a breast shape model and a probabilistic atlas using sets of training breast images can be found in the co-pending non-provisional application titled "Method and Apparatus for Probabilistic Atlas Based on Shape Modeling Technique", the entire contents of which are hereby incorporated by reference. A shape model stored by reference data unit 158B includes a baseline breast atlas image and a set of deformation modes. A shape model stored by reference data unit 158B is similar to a shape model stored by reference data unit 158A as described at FIG. 4, with two differences. One difference is that the nipple of the baseline breast atlas shape need not be identified and marked for the baseline breast atlas shape stored by reference data unit 158B. The second difference pertains to the method of generation of the shape model during off-line training. The training breast images used to generate the shape model for reference data unit 158B off-line are preferably breast images without artifacts (such as tags, noise, frames, image scratches, lead markers, imaging plates, etc.), anomalies, or unusual structures. Training breast images without artifacts may be obtained by removing artifacts, anomalies, or unusual structures from the images manually or automatically, before off-line training. In that case, the baseline breast atlas shape obtained as described in the co-pending non-provisional application titled "Method and Apparatus for Probabilistic Atlas Based on Shape Modeling Technique", the entire contents of which are hereby incorporated by reference, illustrates a baseline breast without artifacts, anomalies, or unusual structures. The deformation modes obtained as described in the co-pending non-provisional application titled "Method and Apparatus for Probabilistic Atlas Based on Shape Modeling Technique", the entire contents of which are hereby incorporated by reference, describe variations between shapes of training breast images and the baseline breast atlas shape. Hence, linear combinations of the deformation modes will produce breast shapes without artifacts, anomalies, or unusual structures, because the deformation modes were obtained from training breast images that did not include artifacts, anomalies, or unusual structures. Reference data unit 158B stores information for shape models for breasts, for various views of mammograms.

Shape registration unit 138B may perform shape registration in a manner similar to shape registration unit 138A, as described at FIG. 6. Optional atlas warping unit 340 receives the registration results for a breast mask image from shape registration unit 138B, and warps the breast mask image to the baseline breast atlas shape from the shape model associated with the view of the breast mask image. Atlas warping unit 340 performs warping of breast mask images to baseline breast atlas shapes or to probabilistic atlases, as described in FIG. 4 and FIG. 7.

Using the image processing unit 38B it is possible to remove artifacts, such as tags, noise, frames, image scratches, lead markers, imaging plates, etc., from a breast image and perform an accurate segmentation of the breast in the breast image. For a breast image $I_T$ including artifacts, image operations unit 128B obtains a breast mask image $B_{T\_mask}$. Shape registration unit 138B then performs shape registration for the breast mask image $B_{T\_mask}$. Shape registration unit 138B expresses the breast mask image $B_{T\_mask}$ as a function of the baseline breast atlas shape, which may be a mean breast shape ($B_a$), and shape model deformation modes, as:

$$\text{Breast Shape} = B_a + p + \sum_{i=1}^{k} \alpha_i L_i,$$

where $L_i$, i=1 ... k is the set of deformation modes of the shape model, $\alpha_i$, i=1 ... k are a set of parameters optimized by shape registration unit 138B for breast mask image $B_{T\_mask}$, and p is an offset (such as a 2D offset) to the mean breast shape $B_a$ to account for a rigid translation of the entire shape. Shape registration unit 138B retrieves baseline breast atlas shape data and deformation modes from reference data unit 158B. Since the shape model stored in reference data unit 158B was generated using training breast shape images without artifacts, anomalies, or unusual structures, the Breast Shape obtained from $$\text{Breast Shape} = B_a + p + \sum_{i=1}^{k} \alpha_i L_i$$

with optimized $\alpha_i$ and p parameters will not include artifacts, anomalies, or unusual structures. In other words, the Breast Shape will optimize a fit to the original breast mask image $B_{T\_mask}$, except for the artifacts that were present in the original breast mask image $B_{T\_mask}$. The artifacts present in the original breast mask image $B_{T\_mask}$ have not been learned by the shape model stored in reference data unit 158B, and will not be fit. Hence, the Breast Shape represents a segmentation of the breast in the breast mask image $B_{T\_mask}$, without the artifacts may have been present in breast mask image $B_{T\_mask}$.

Artifact removal unit 360 receives the Breast Shape together with the breast mask image $B_{T\_mask}$ from shape registration unit 138B, and may extract artifacts by subtracting the Breast Shape from the breast mask image $B_{T\_mask}$, to obtain an artifact mask image $I_{Art}$.

Artifact removal unit 360 can then apply the artifact mask image $I_{Art}$ to the original breast image $I_T$, to identify artifact positions in the original breast image $I_T$ and remove the artifacts. Artifact removal unit 360 outputs a breast image $I_T'$ without artifacts.

If the reference data unit 158B contains a probabilistic feature atlas, and atlas warping unit 340 is present in image processing unit 38B, breast segmentation with artifact removal may be combined with feature detection. For example, artifact removal may be achieved for an original breast image $I_T$ together with cancer detection using a probabilistic cancer atlas and/or comparative left-right breast analysis, as described in the co-pending non-provisional application titled "Method and Apparatus of Using Probabilistic Atlas for Cancer Detection", the entire contents of which are hereby incorporated by reference.

Image operations unit 128B, shape registration unit 138B, optional atlas warping unit 340, artifact removal unit 360, and reference data unit 158B are software systems/applications. Image operations unit 128B, shape registration unit 138B, optional atlas warping unit 340, artifact removal unit 360, and reference data unit 158B may also be purpose built hardware such as FPGA, ASIC, etc.

Figure 10A:
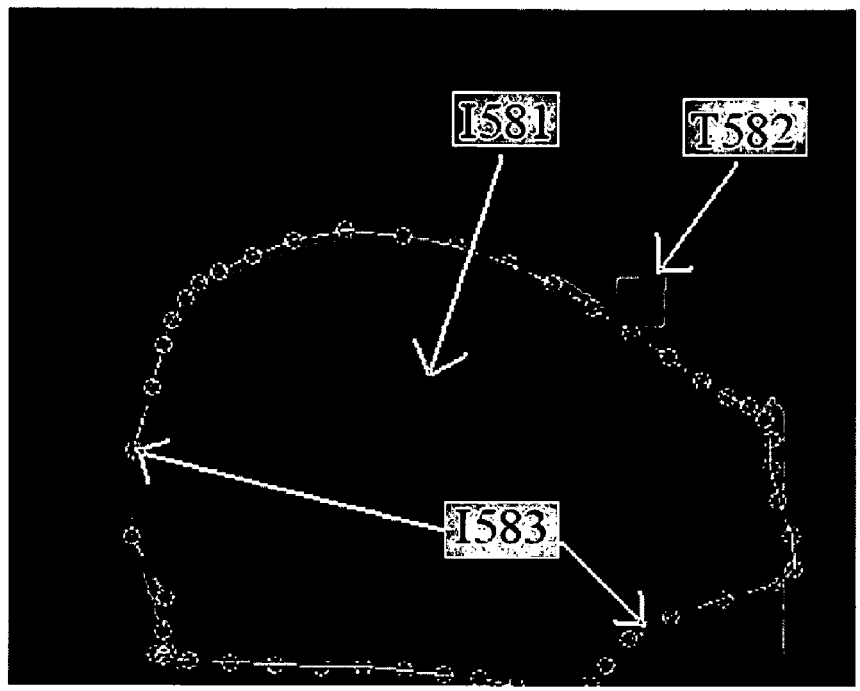
FIG. 10A illustrates an exemplary output of an image processing unit for artifact removal and breast segmentation according to a second embodiment of the present invention illustrated in FIG. 9.

FIG. 10A illustrates an exemplary output of an image processing unit 38B for artifact removal and breast segmentation according to a second embodiment of the present invention illustrated in FIG. 9. A breast mask I581 with a tag T582 is segmented by image processing unit 35B using a shape model that was constrained to remain within the shape space of typical breasts without artifacts. The final segmented breast shape I583 obtained by image processing unit 35B does not contain the tag T582, as the segmented breast shape is constrained by the shape model to resemble a breast.

Figure 10B:
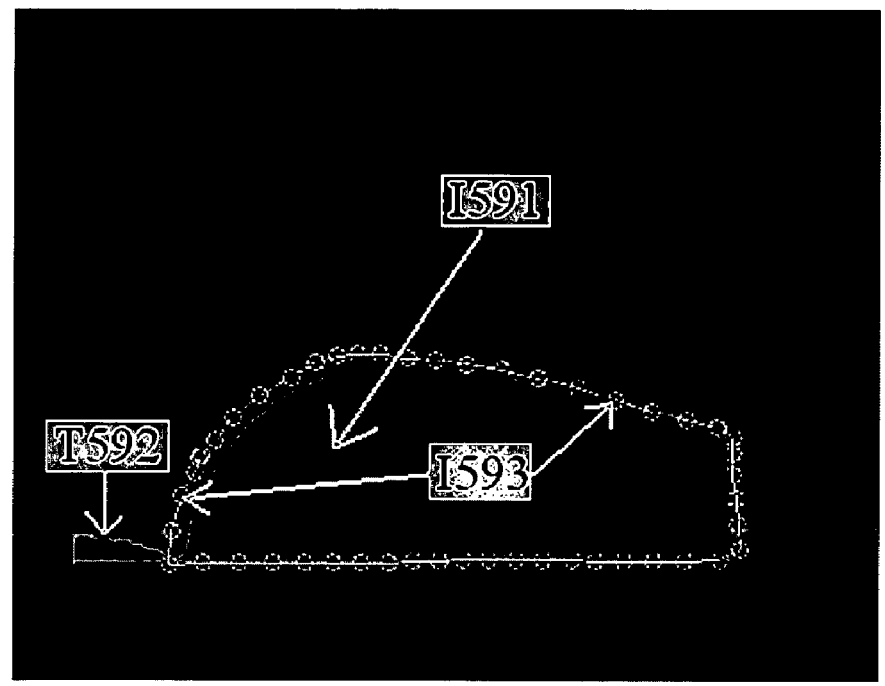
FIG. 10B illustrates another exemplary output of an image processing unit for artifact removal and breast segmentation according to a second embodiment of the present invention illustrated in FIG. 9.

FIG. 10B illustrates another exemplary output of an image processing unit 38B for artifact removal and breast segmentation according to a second embodiment of the present invention illustrated in FIG. 9. A breast mask I591 with a skin fold T592 is segmented by image processing unit 35B using a shape model that was constrained to remain within the shape space of typical breasts without artifacts. The final segmented breast shape I593 obtained by image processing unit 35B does not contain the skin fold T592, as the segmented breast shape is constrained by the shape model to resemble a breast.

Figure 11:
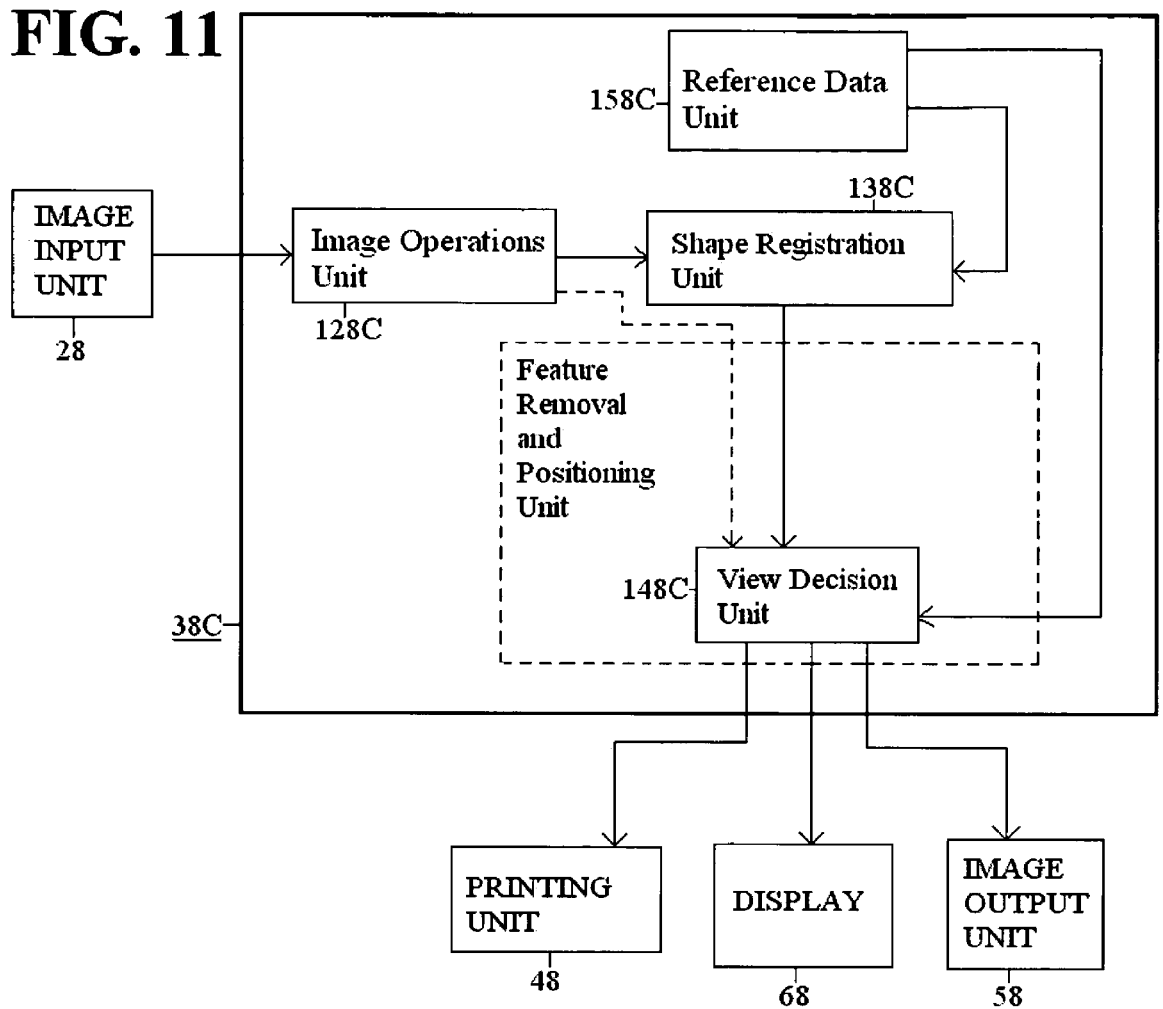
FIG. 11 is a block diagram of an image processing unit for view detection according to a third embodiment of the present invention illustrated in FIG. 2.

FIG. 11 is a block diagram of an image processing unit 38C for view detection according to a third embodiment of the present invention illustrated in FIG. 2. As shown in FIG. 11, the image processing unit 38C according to this embodiment includes: an image operations unit 128C; a shape registration unit 138C; a view decision unit 148C; and a reference data unit 158C. The view decision unit 148C is a feature removal and positioning unit.

Image operations unit 128C receives a breast image from image input unit 28, and may perform preprocessing and preparation operations on the breast image. Preprocessing and preparation operations performed by image operations unit 128C may include resizing, cropping, compression, color correction, etc., that change size and/or appearance of the breast image. Image operations unit 128C creates a breast mask image. Breast mask images may be created, for example, by detecting breast borders or breast clusters for the breasts shown in the breast image. Image operations unit 128C may also store/extract information about the breast image, such as view of mammogram.

Image operations unit 128C may perform preprocessing and breast mask extraction operations in a similar manner to image operations unit 128A described in FIG. 5. Image operations unit 128C may create a breast mask image by detecting breast borders using methods described in the U.S. patent application titled "Method and Apparatus for Breast Border Detection", application Ser. No. 11/366,495, by Daniel Russakoff and Akira Hasegawa, filed on Mar. 3, 2006, the entire contents of which are hereby incorporated by reference.

Image operations unit 128C sends the breast mask images to shape registration unit 138C, which performs shape registration for the breast mask image. For shape registration, shape registration unit 138C describes the breast mask image using a shape model, to obtain a registered breast shape. Shape registration unit 138C retrieves information about the shape model from reference data unit 158C, which stores parameters that define the shape model.

The reference data unit 158C is similar to reference data unit 158A from FIG. 4. The reference data unit 158C stores shape models, and may also store probabilistic atlases.

A shape model stored by reference data unit 158C can be generated off-line, using training breast images. Details on generation of a breast shape model using sets of training breast images can be found in the co-pending non-provisional application titled "Method and Apparatus for Probabilistic Atlas Based on Shape Modeling Technique", the entire contents of which are hereby incorporated by reference. A shape model stored by reference data unit 158C includes a baseline breast atlas image and a set of deformation modes.

Shape registration unit 138C may perform shape registration in a manner similar to shape registration unit 138A, as described at FIG. 6. Shape registration unit 138C receives from image operations unit 128C a breast mask image $B_{mask}$ of unknown mammogram view. $B_{mask}$ could be, for example, an ML mammogram view for which the view direction of left or right is not known.

Shape registration unit 138C fits the breast mask image $B_{mask}$ to a shape model M associated with one of left or right views, and obtains a registered image $R_1$. Shape registration unit 138C then flips the breast mask image $B_{mask}$ about a vertical axis to obtain a flipped breast mask $B_{mask\_Flipped}$, and then fits the flipped breast mask image $B_{mask\_Flipped}$ to the same shape model M, to obtain a registered image $R_2$.

View detection unit 148C receives breast mask images $B_{mask}$ and $B_{mask\_Flipped}$, and registered images $R_1$ and $R_2$. View detection unit 148C then compares the fit of $R_1$ to $B_{mask}$, and the fit of $R_2$ to $B_{mask\_Flipped}$. If the fit of $R_1$ to $B_{mask}$ is better than the fit of $R_2$ to $B_{mask\_Flipped}$, then the view associated with shape model M is the view of the breast image $B_{mask}$. On the other hand, if the fit of $R_2$ to $B_{mask\_Flipped}$ is better than the fit of $R_1$ to $B_{mask}$, then the view associated with shape model M is the view of breast image $B_{mask\_Flipped}$. The view direction of the breast mask image $B_{mask}$ is hence detected. View detection results are output to printing unit 48, display 68, and/or image output unit 58.

The view of breast mask image $B_{mask}$ may also be detected by comparison to a baseline shape. Let $B_a$ be the baseline breast atlas shape associated with the shape model M. View detection unit 148C compares the differences between $R_1$ and $B_a$, and the differences between $R_2$ and $B_a$. If the differences between $R_1$ and $B_a$ are smaller than the differences between $R_2$ and $B_a$, then the view associated with baseline breast atlas shape $B_a$ (and hence with shape model M) is the view of breast image $B_{mask}$. On the other hand, if the differences between $R_2$ and $B_a$ are smaller than the differences between $R_1$ and $B_a$, then the view associated with baseline breast atlas shape $B_a$ (and hence with shape model M) is the view of breast image $B_{mask\_Flipped}$.

The view of breast mask images $B_{mask}$ may also be detected by direct comparison of $B_{mask}$ and $B_{mask\_Flipped}$ with $B_a$, without performing shape registration of $B_{mask}$ and $B_{mask\_Flipped}$. If the differences between $B_{mask}$ and $B_a$ are smaller than the differences between $B_{mask\_Flipped}$ and $B_a$, then the view associated with baseline breast atlas shape $B_a$ is the view of breast image $B_{mask}$. On the other hand, if the differences between $B_{mask}$ and $B_a$ are larger than the differences between $B_{mask\_Flipped}$ and $B_a$, then the view associated with baseline breast atlas shape $B_a$ is the view of breast image $B_{mask\_Flipped}$.

Figure 12:
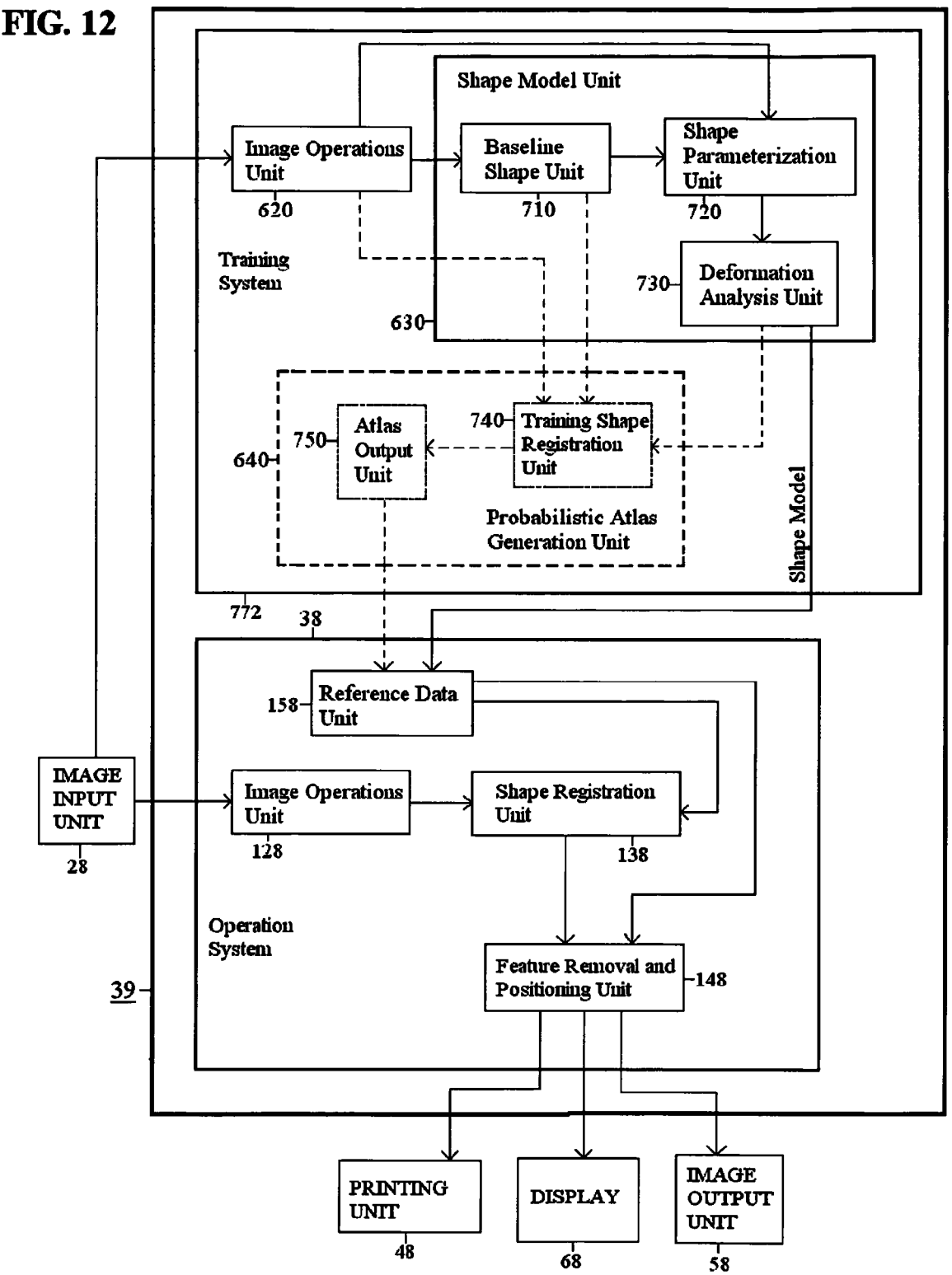
FIG. 12 is a block diagram of an image processing unit for feature removal/positioning including a training system according to a fourth embodiment of the present invention.

FIG. 12 is a block diagram of an image processing unit 39 for feature removal/positioning including a training system 772 according to a fourth embodiment of the present invention. As shown in FIG. 12, the image processing unit 39 includes the following components: an image operations unit 620; a baseline shape unit 710; a shape parameterization unit 720; a deformation analysis unit 730; a training shape registration unit 740; an atlas output unit 750; an image operations unit 128; a shape registration unit 138; a feature removal and positioning unit 148; and a reference data unit 158. Image operations unit 620, baseline shape unit 710, shape parameterization unit 720, deformation analysis unit 730, training shape registration unit 740, and atlas output unit 750 are included in a training system 772. Training shape registration unit 740 and atlas output unit 750 are optional, and may be included depending on the application. Image operations unit 128, shape registration unit 138, feature removal and positioning unit 148, and reference data unit 158 are included in an operation system 38.

Operation of the image processing unit 39 can generally be divided into two stages: (1) training; and (2) operation for positioning and for feature removal or detection.

The principles involved in the training stage have been described in the co-pending non-provisional application titled "Method and Apparatus for Probabilistic Atlas Based on Shape Modeling Technique", the entire contents of which are hereby incorporated by reference. In accordance with this fourth embodiment illustrated in FIG. 12, the image operations unit 620, baseline shape unit 710, shape parameterization unit 720, deformation analysis unit 730, training shape registration unit 740, and atlas output unit 750 train to generate a shape model and a probabilistic feature atlas for breast shapes. The knowledge accumulated through training by training system 772 is sent to reference data unit 158. Image operations unit 620 and shape model unit 630 trains to generate a shape model. Optional probabilistic atlas generation unit 640 trains to generate a probabilistic atlas. The shape model and the probabilistic atlas are sent and stored in reference data unit 158.

In accordance with this fourth embodiment of the present invention, the image operations unit 128, the shape registration unit 138, the feature removal and positioning unit 148, and the reference data unit 158 may function in like manner to the corresponding elements of the first, second, or third embodiments illustrated in FIGS. 4, 9, and 11, or as a combination of two or more of the first, second, and third embodiments illustrated in FIGS. 4, 9, and 11. During regular operation of image processing unit 39, reference data unit 158 provides reference data training knowledge to shape registration unit 138 and to feature removal and positioning unit 148, for use in nipple detection, view detection, and artifact removal from breast images. The principles involved in the operation for nipple detection for new breast images have been described in FIGS. 4, 5, 6, 7, 8A, 8B, 8C, 8D, 8E, 8F, 8G, 8H, 8I and 8J. The principles involved in the operation for artifact removal from breast images have been described in FIGS. 9, 5, 6, 7, 8A, 8B, 8C, 8D, 8E, 8F, 8G, 8H, 8I and 8J. The principles involved in the operation for view detection for new breast images have been described in FIGS. 11, 5, 6, 7, 8A, 8B, 8C, 8D, 8E, 8F, 8G, 8H, 8I and 8J.

During the training stage, image operations unit 620 receives a set of training breast images from image input unit 28, performs preprocessing and preparation operations on the breast images, creates training breast mask images, and stores/extracts information about breast images, such as view of mammograms. Additional details regarding operation of image operations unit 620 are described in the co-pending non-provisional application titled "Method and Apparatus for Probabilistic Atlas Based on Shape Modeling Technique", the entire contents of which are hereby incorporated by reference. Image operations unit 620 may create breast mask images by extracting breast borders using methods described in the U.S. patent application titled "Method and Apparatus for Breast Border Detection", application Ser. No. 11/366,495, by Daniel Russakoff and Akira Hasegawa, filed on Mar. 3, 2006, the entire contents of which are hereby incorporated by reference. Other breast border detection techniques can also be used by image operations unit 620 to obtain shape mask images for breast images.

Baseline shape unit 710 receives training breast mask images from image operations unit 620, and generates a baseline breast atlas shape such as, for example, a mean breast shape, from the training breast mask images. Baseline shape unit 710 may align the centers of mass of the training breast mask images. The alignment of centers of mass of training breast mask images results in a probabilistic map in which the brighter a pixel is, the more likely it is for the pixel to appear in a training breast mask image. A probability threshold may then be applied to the probabilistic map, to obtain a baseline breast atlas shape, such as, for example, a mean breast shape. Additional details regarding operation of baseline shape unit 710 are described in the co-pending non-provisional application titled "Method and Apparatus for Probabilistic Atlas Based on Shape Modeling Technique", the entire contents of which are hereby incorporated by reference.

Shape parameterization unit 720 receives the training breast mask images and the baseline breast atlas shape, and warps the training breast mask images onto the baseline breast atlas shape, to define parameterization of breast shape. Shape parameterization unit 720 may use shape parameterization techniques adapted from "Automatic Generation of Shape Models Using Nonrigid Registration with a Single Segmented Template Mesh" by G. Heitz, T. Rohlfing and C. Maurer, Proceedings of Vision, Modeling and Visualization, 2004, the entire contents of which are hereby incorporated by reference. Control points may be placed along the edges of the baseline breast atlas shape. A deformation grid is generated using the control points. Using the deformation grid, the control points are warped onto training breast mask images. Shape information for training breast mask images is then given by the corresponding warped control points together with centers of mass of the shapes defined by the warped control points. Warping of control points from the baseline breast atlas shape onto training breast mask images may be performed by non-rigid registration, with B-splines transformations used to define warps from baseline breast atlas shape to training breast mask images. Shape parameterization unit 720 may perform non-rigid registration using techniques discussed in "Automatic Construction of 3-D Statistical Deformation Models of the Brain Using Nonrigid Registration", by D. Rueckert, A. Frangi and J. Schnabel, IEEE Transactions on Medical Imaging, 22(8), p. 1014-1025, August 2003, the entire contents of which are hereby incorporated by reference. Shape parameterization unit 720 outputs shape representations for training breast mask images. Additional details regarding operation of shape parameterization unit 720 are described in the co-pending non-provisional application titled "Method and Apparatus for Probabilistic Atlas Based on Shape Modeling Technique", the entire contents of which are hereby incorporated by reference.

Deformation analysis unit 730 uses breast shape parameterization results to learn a shape model that describes how shape varies from breast to breast. Using representations of shape for the training breast mask images, deformation analysis unit 730 finds the principal modes of deformation between the training breast mask images and the baseline breast atlas shape. Deformation analysis unit 730 may use Principal Components Analysis (PCA) techniques to find the principal modes of deformation. The principal components obtained from PCA represent modes of deformation between training breast mask images and the baseline breast atlas shape. Additional details regarding operation of deformation analysis unit 730 are described in the co-pending non-provisional application titled "Method and Apparatus for Probabilistic Atlas Based on Shape Modeling Technique", the entire contents of which are hereby incorporated by reference.

The baseline breast atlas shape and the modes of deformation between training breast mask images and the baseline breast atlas shape, define a shape model. A shape model can be obtained for each mammogram view. Shape model information is sent to reference data unit 158, to be used during operation of image processing unit 39.

Training shape registration unit 740 receives data that defines the shape model. Training shape registration unit 740 then fits training breast mask images with their correct shape representations, which are linear combinations of the principal modes of shape variation. Shape registration unit 740 may use the downhill simplex method, also known as the Nelder-Mead or the amoeba algorithm, to optimize parameters of the shape model for each training breast mask image in the training dataset, and optimally describe training breast mask images using the shape model. Additional details regarding operation of training shape registration unit 740 are described in the co-pending non-provisional application titled "Method and Apparatus for Probabilistic Atlas Based on Shape Modeling Technique", the entire contents of which are hereby incorporated by reference.

Atlas output unit 750 receives from training shape registration unit 740 the results of shape registration for the set of training breast mask images analyzed. The set of training breast mask images have features that have been previously localized. Features could be cancer structures, benign structures, vessel areas, etc. Using shape registration results, the localized features in the training breast mask images are mapped from the training breast mask images onto the baseline breast atlas shape. An atlas is created with locations of the features in the baseline breast atlas shape. Since a large number of training breast mask images with previously localized features are used, the atlas is a probabilistic atlas that gives the probability for feature presence at each pixel inside the baseline breast atlas shape. One probabilistic atlas may be generated for each mammogram view. The probabilistic feature atlases for various breast views are sent to reference data unit 158, to be used during operation of image processing unit 39. Additional details regarding operation of atlas output unit 750 are described in the co-pending non-provisional application titled "Method and Apparatus for Probabilistic Atlas Based on Shape Modeling Technique", the entire contents of which are hereby incorporated by reference.

Image operations unit 620, baseline shape unit 710, shape parameterization unit 720, deformation analysis unit 730, training shape registration unit 740, atlas output unit 750, image operations unit 128, shape registration unit 138, feature removal and positioning unit 148, and probabilistic atlas reference unit 158 are software systems/applications. Image operations unit 620, baseline shape unit 710, shape parameterization unit 720, deformation analysis unit 730, training shape registration unit 740, atlas output unit 750, image operations unit 128, shape registration unit 138, feature removal and positioning unit 148, and probabilistic atlas reference unit 158 may also be purpose built hardware such as FPGA, ASIC, etc.

Methods and apparatuses disclosed in this application can be used for breast segmentation, artifact removal, mammogram view identification, nipple detection, etc. Methods and apparatuses disclosed in this application can be combined with methods and apparatuses disclosed in the co-pending non-provisional application titled "Method and Apparatus of Using Probabilistic Atlas for Cancer Detection", the entire contents of which are hereby incorporated by reference, to perform breast segmentation, artifact removal, mammogram view identification, nipple detection, together with cancer detection for mammography images. Shape models and probabilistic atlases generated using techniques described in the co-pending non-provisional application titled "Method and Apparatus for Probabilistic Atlas Based on Shape Modeling Technique", the entire contents of which are hereby incorporated by reference, can be used for breast segmentation, artifact removal, mammogram view identification, nipple detection, and cancer detection. Additional applications, such as temporal subtraction between breast images can be implemented using methods and apparatuses disclosed in this application, and methods and apparatuses disclosed in "Method and Apparatus of Using Probabilistic Atlas for Cancer Detection".

The methods and apparatuses disclosed in this application can be used for automatic detection of other features besides nipples in breasts. The methods and apparatuses can be used for feature removal, feature detection, feature positioning, and segmentation for other anatomical parts besides breasts, by using shape modeling techniques for the anatomical parts and atlases for locations of features in the anatomical parts. The methods and apparatuses disclosed in this application can be coupled with methods and apparatuses from "Method and Apparatus of Using Probabilistic Atlas for Cancer Detection" using shape models and probabilistic atlases generated as described in "Method and Apparatus for Probabilistic Atlas Based on Shape Modeling Technique", to perform feature removal, feature detection, feature positioning, and object segmentation for other objects and anatomical objects besides breasts, and other features besides cancer structures or breast features.

Although detailed embodiments and implementations of the present invention have been described above, it should be apparent that various modifications are possible without departing from the spirit and scope of the present invention.

I claim:

1. An image processing method, said method comprising:
    accessing digital image data representing an image of a first object, the image also including, against a background, an element which belongs to a second imaged object, wherein the second object is not related to said first object and is independent from said first object;
    accessing reference data including a shape model relating to shape variation of objects from a baseline object, said objects and said baseline object being from a class of said first object;
    performing shape registration for said image which includes said first object and said element belonging to said second imaged object, to obtain an object representation for said first object, by representing a shape of said first imaged object from said image using said shape model; and
    removing from said image said element which belongs to said second imaged object, said element removing step being performed based on a difference between
    the shape of said first imaged object from said image, and said object representation for said first object.

2. The image processing method as recited in claim 1, wherein
    said shape model includes deformation modes to describe shape deformation between said shape of said object and said baseline object, and
    said step of performing shape registration fits said shape of said object using combinations of said deformation modes.

3. The image processing method as recited in claim 2, wherein said step of performing shape registration fits said shape of said object to linear combinations of said deformation modes, by optimizing linear coefficients for said deformation modes.

4. The image processing method as recited in claim 3, wherein said step of performing shape registration optimizes said linear coefficients for said deformation modes using a downhill simplex method.

5. The image processing method as recited in claim 1, wherein said object is a breast, and said element is one of noise, a scratch, a tag, a marker, and an artifact caused by an imaging system imaging said breast.

6. The image processing method as recited in claim 1, further comprising:
   training using said objects from said class of said object, to generate said baseline object and said shape model, said training step including
      generating said baseline object by aligning shapes of said objects using centers of mass of said objects, and
      determining deformation modes using Principal Component Analysis, to describe shape deformations between said shapes of said objects and said baseline object.

7. An image processing apparatus, said apparatus comprising:
   an image data input unit for providing digital image data representing an image of a first object, the image also including, against a background an element which belongs to a second imaged object, wherein the second object is not related to said first object and is independent from said first object;
   a reference data unit for providing reference data including a shape model relating to shape variation of objects from a baseline object, said objects and said baseline object being from a class of said first object;
   a registration unit for performing shape registration for said image which includes said first object and said element belonging to said second imaged object, to obtain an object representation for said first object, by representing a shape of said first imaged object from said image using said shape model; and
   a feature removal unit for removing from said image said element which belongs to said second imaged object, said feature removal unit removing said element based on a difference between
   the shape of said first imaged object from said image, and said object representation for said first object.

8. The apparatus according to claim 7, wherein
   said shape model includes deformation modes to describe shape deformation between said shape of said object and said baseline object, and
   said registration unit fits said shape of said object using combinations of said deformation modes.

9. The apparatus according to claim 8, wherein said registration unit fits said shape of said object to linear combinations of said deformation modes, by optimizing linear coefficients for said deformation modes.

10. The apparatus according to claim 7, wherein said object is a breast, and said element is one of noise, a scratch, a tag, a marker, and an artifact caused by an imaging system imaging said breast.

11. The apparatus according to claim 7, further comprising:
   a training unit for training using said objects from said class of said object, to generate said baseline object and said shape model, said training unit training by
      generating said baseline object by aligning shapes of said objects using centers of mass of said objects, and
      determining deformation modes using Principal Component Analysis, to describe shape deformations between said shapes of said objects and said baseline object.

\* \* \* \* \*